Figure 1A:
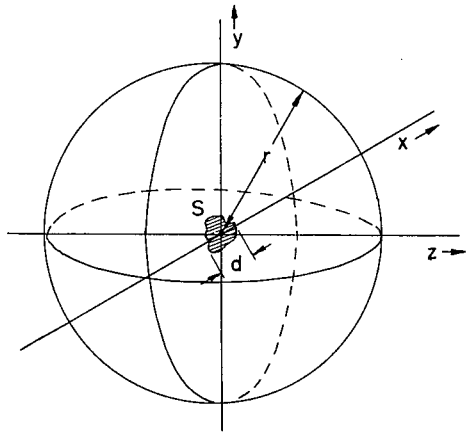

United States Patent [19]

Schmidt-Weinmar

[11] 3,950,103
[45] Apr. 13, 1976

[54] METHOD AND APPARATUS TO DETERMINE SPATIAL DISTRIBUTION OF MAGNITUDE AND PHASE OF ELECTRO-MAGNETIC FIELDS ESPECIALLY OPTICAL FIELDS

[75] Inventor: Heinz Günter Schmidt-Weinmar, Edmonton, Canada

[73] Assignee: Canadian Patents and Development Limited, Ottawa, Canada

[22] Filed: June 21, 1974

[21] Appl. No.: 481,881

Related U.S. Application Data

[63] Continuation-in-part of Ser. No. 347,703, April 4, 1973, abandoned.

[30] Foreign Application Priority Data

Oct. 27, 1972 Canada.................................. 154991

[52] U.S. Cl............................. 356/106 R; 356/109
[51] Int. Cl.²........................................... G01B 9/02
[58] Field of Search ........... 356/106, 107, 108, 109, 356/113

[56] References Cited
UNITED STATES PATENTS 3,218,916  11/1965  Saunders............................. 356/113
3,694,088  9/1972  Gallagher et al................ 356/106 R

*Primary Examiner*—Alfred E. Smith
*Assistant Examiner*—Conrad J. Clark
*Attorney, Agent, or Firm*—James R. Hughes

[57] ABSTRACT

A method and apparatus for numerical determination of the distribution of magnitude and phase of a time harmonic electromagnetic, particularly an optical, wave field by using the wavefront of a reference wave as the optical reference surface and by introducing additional information to the recording process such that the field becomes uniquely determined and this is realized by the recording of three interference fringe patterns which belong to variations of the reference field distribution. A reference field is chosen whose spatial distribution is similar to the unknown field whereby fringes are obtained the position of which varies slowly with the recording coordinates. The recorded data are numerically evaluated and this may be done conveniently in a computer. After these measurements are made the reference beam is shifted by an optical element e.g. a prism, gaseous wedge, electro-optical diffraction device placed in the reference optical path and a second set of measurements is made. In this way a reference field whose spatial distribution is not known precisely is introduced but the system is such that the reference spatial distribution information is used and then eliminated from the information finally obtained on the unknown wavefield.

9 Claims, 32 Drawing Figures

REFERENCE SURFACE "FAR DISTANT SPHERE"

$$x^2 + y^2 + z^2 = r^2$$

WITH $\quad \dfrac{\pi}{4} \dfrac{d^2}{\lambda_0 \cdot r} \ll 2\pi$ $\lambda_0$: WAVE LENGTH OF LIGHT

REFERENCE SURFACE
"OBJECT PLANE" Z=0

REFERENCE SURFACE
"DEFORMED CYLINDER"

$$\underbrace{\delta_1\bar{R} \times (\delta_2\bar{R} - \delta_3\bar{R})}_{1^{st}\ TERM} + \underbrace{\delta_2\bar{R} \times \delta_3\bar{R}}_{2^{nd}\ TERM} \neq 0$$

$1^{st}$ TERM $\neq 0$ $2^{nd}$ TERM $= 0$ $1^{st}$ TERM $\neq 0$ $2^{nd}$ TERM $\neq 0$ $1^{st}$ TERM $+$ $2^{nd}$ TERM $\neq 0$ $1^{st}$ TERM $= 0$ $2^{nd}$ TERM $\neq 0$

PHASE REFERENCE SURFACE

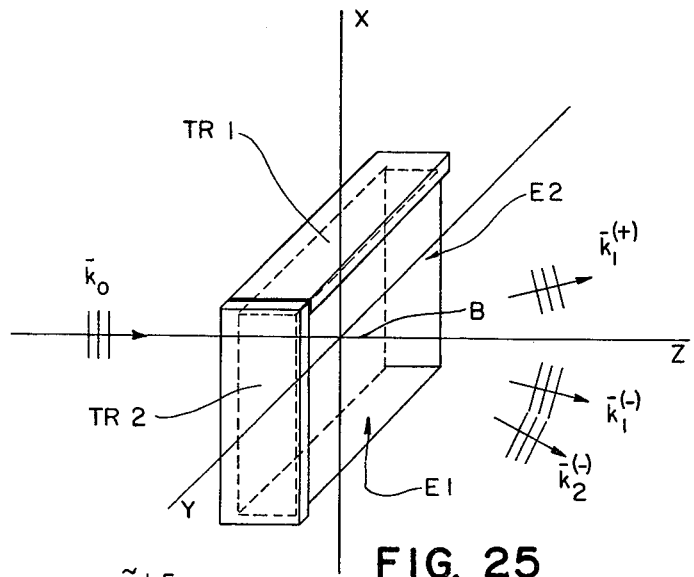
FIG. 25
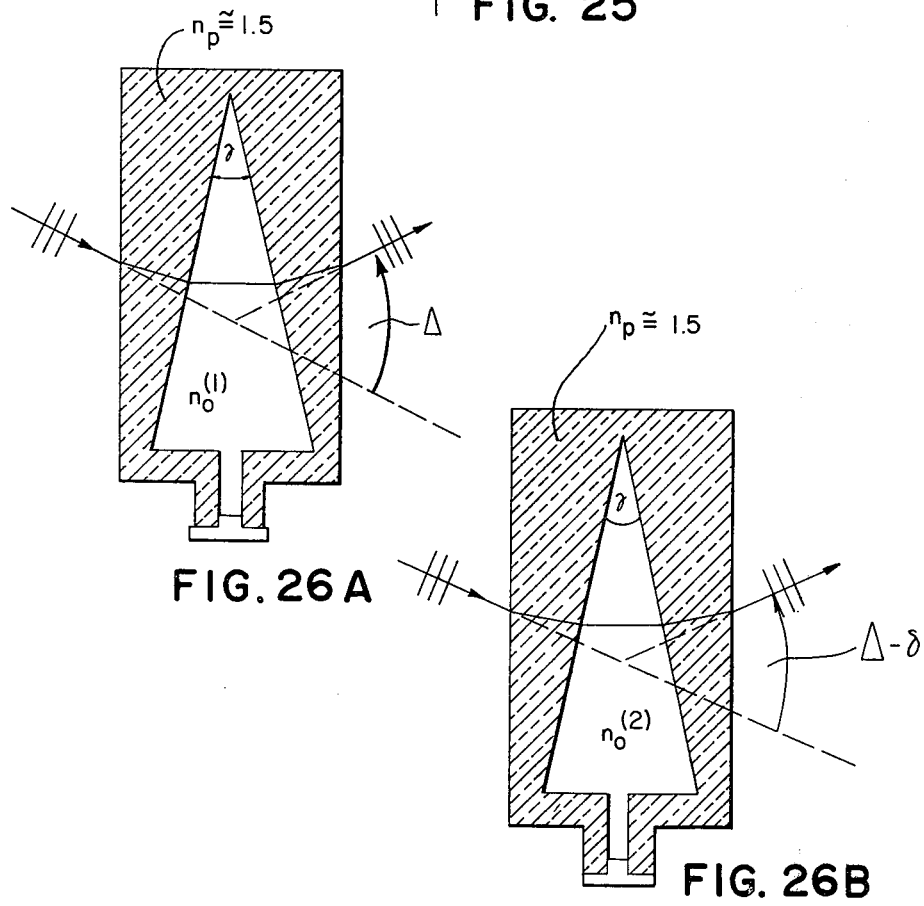
FIG. 26A
FIG. 26B

METHOD AND APPARATUS TO DETERMINE SPATIAL DISTRIBUTION OF MAGNITUDE AND PHASE OF ELECTRO-MAGNETIC FIELDS ESPECIALLY OPTICAL FIELDS

This application is a Continuation-in-Part of application Ser. No. 347,703, filed Apr. 4, 1973 and now abandoned.

This invention relates to a method and apparatus for determining the spatial distribution of magnitude and phase of wave fields especially optical fields and more particularly to a means of numerically determining the distributing of magnitude and phase of a time harmonic optical wave field by comparing interferometrically the unknown field to a reference field. The system includes methods and apparatus for calibrating the reference field and in fact when measuring the spatial distribution of magnitude and phase of an unknown field, a reference field whose spatial distribution is not known precisely is introduced but the system is such that the reference spatial distribution information is used and then eliminated from the information finally obtained on the unknown wavefield.

In U.S. Pat. No. 3,694,088 entitled "Wavefront Measurement" and issued on Sept. 1972 to J. E. Gallagher and D. R Herriott, a bridge system of wavefront measurement based on a conventional interferometer is disclosed. This system measures three values of intensity at each point in an interference pattern and provides amplitude and phase information from the simultaneous solution of three equations corresponding to the three measured values of intensity. The reference used is obtained from a mirror.

The fringe pattern (interferogram) due to the interference of some field F and some reference field R is given by $$J = |R + F|^2 = |R|^2 |1 + \alpha|^2 \qquad (1)$$

where $J$ is proportional to the irradiance, $\alpha = F/R$, and where both the complex amplitude $F(\bar{x}) = A(\bar{x}) \exp[j\Psi(\bar{x})]$ and $R(\bar{x}) = B(\bar{x}) \exp[j\phi(\bar{x})]$ are given as complex functions of the the spatial coordinates $\bar{x} = (x,y,z)$. to be able to determine magnitude and phase distribution of the unknown field it is necessary to invert the above equation and find the complex number (phasor) F. If this can be done, then the magnitude (A) and phase ($\Psi$) that is, the complex amplitude of the unknown field can be determined, it being assumed that the amplitude (B) and phase ($\phi$) of the phasor R are known or considered a reference. F stands, e.g., for the phasor belonging to one component of the electric field E, say $E_x$, or one component of the magnitude field H, say $H_x$. The relation given above accounts for the fact that at optical frequencies ($10^{12} - 10^{15}$ cps) no detector exists at the present time which allows one to monitor in a linear way the time-varying electromagnetic field. The response time of the fastest detectors available at the present time is about $10^{-10} - 10^{-12}$ seconds and this leaves approximately three orders of magnitude between the period of the leectromagnetic vibrations and the response time of the detector. Under these conditions, onlyy a time average (J) of the energy flux can be measured, taken over an interval T that contains many periods $\tau \approx 10^{-15}$ seconds $$J = \frac{1}{T} \int_0^T E_x^2(t)dt \qquad (2)$$

where $$T >> \tau \equiv \frac{2\pi}{\omega}$$

and J is proportional to the irradiance or the average energy per cm² second. It can be shown (M. Born and E. Wolf, Principles of Optics, Oxford 1964, 3rd ed. p.33) that J is proportional to the magnitude square $|F|^2$ of the phasor F belonging to $E_x$. If we write:

$$E_x(x,y,z,t) = Re \{F(x,y,z) \exp[j\omega t]\} \qquad (3)$$

where Re denoting the real part of the complex number within the bracket and if we set $$F = A \exp[j\Psi] = A(x,y,z) \exp[j\Psi(x,y,z)] \qquad (4)$$

we obtain for $$E_x = (A(x,y,z))(\cos(\Psi(x,y,z) - \omega t)) \qquad (5)$$

and for $$J = \frac{1}{T} \int_0^T E_x^2(x,y,z,t)dt = \frac{A^2}{T} \int_0^T \cos^2(\Psi - \omega t)dt$$

$$= \frac{A^2(x,y,z)}{2} = \frac{|F|^2}{2} \qquad (6)$$

From this it can be seen that by measuring J we do not obtain a value of $\Psi(x,y,z)$ but of $A(x,y,z)$ only. But the distribution of the phase $\Psi(x,y,z)$ of the unknown field F is an important quantity in optics and often governs more strongly the propagation of this wave field than the magnitude distribution $A(x,y,z)$ does. For example for a homogeneous plane wave which propagates along the direction given by the unit vector ($\cos\alpha_1$, $\cos\alpha_2$, $\cos\alpha_3$) we have $$E_x = Re\{A \exp[j(\Psi-\omega t)]\} = Re\{A_o \exp[j(k_o(x\cos\alpha_1 + y\cos\alpha_2 + z\cos\alpha_3) + \Psi_o - \omega t)]\} \qquad (7)$$

In this case the magnitude a is a constant ($A_o$). And for a spherical wave arising from the origin of the coordinate system we have $$E_x = Re\{A \exp[j(\Psi_o - \omega t)]\}$$

$$= Re\left\{\frac{A_o}{r^2}\exp[j(k_o r + \Psi_o - \omega t)]\right\} \qquad (8)$$

where $r^2 = x^2 + y^2 + z^2$.

Here the magnitude function is the slowly varying function $A_o/r^2$. It may be noted that in both of the cases mentioned above the spatial coordinates occuring within the respective phase function $\Psi(x,y,z)$ are multiplied by the constant $$k_o = \frac{2\pi}{\lambda_o}$$

where $\lambda_o$ is the wavelengthh of light and therefore $\Psi$ varies rapidly with $x,y,z$.

The fact that the phase function $\Psi$ is not available from the measurable value of J has also been called "a loss of 50 percent of information contained by the optical field." Holography has been the first attempt to recover $\Psi$ from J. This has been achieved by mixing the unknown field F with a reference field R before the resulting irradiance $J = |F+R|^2$ is measured. But even when two fields F and R are mixed in this way and the resulting irradiance is measured, there are still infinitely many values of F consistent with the measured value of J for any given value of R. A certain relationship is merely established between amplitude A and phase $\Psi$ by mixing the unknown wave with the reference wave, namely, that the tip of the phasor $\alpha = F/R$, if drawn from the origin of the phasor plane must lie on a circle which is centered at the point −1 and has a radius $\sqrt{J}/|R|$.

There have been two different approaches to this problem of the ambiguous relation between J and $\alpha$ (J and F). With interferometric work it is assumed that the magnitude of the field to be determined is some constant or known at the recording point. This is a reasonable assumption when this field is due to a homogenous wave or when its magnitude varies very slowly with the spatial coordinates. Then the fringe contrast at the recording surface is due to two waves of essentially unit magnitude and from the value of J, the correct value of the place $\Psi(\bar{x})$ can be obtained except its sign. But for the majority of the inhomogeneous waves which are of particular practical interest, we have to assume that amplitude $A(\bar{x})$ varies largely independently of phase $\Psi(\bar{x})$ and in particular is not some constant over the region where the fringes are recorded. Such waves arise, for example, when light is diffracted by holograms or other scattering objects. The problem due to the ambiguity in the relation between J and $\alpha$ cannot be solved unless more information on $\alpha$ is used than can be obtained from a single fringe pattern. Holography, thought it achieves wavefront reconstruction does not evaluate any additional information and in fact does not solve equation (1) for F at any given recording point $(x,y,z)$. Instead from the recorded irradiance at $(x,y,z_o)$ $$J = J(x,y,z_o) = |R + F|^2 = |R|^2 |1 + \alpha|^2$$

with $$\alpha = \frac{F}{R} = \frac{A \exp[j\Psi]}{B \exp[j\phi]} = \frac{A}{B}\exp[j(\Psi-\phi)] \quad (9)$$

and with $z_o$ the z-coordinate of the recording plane, off-axis holography obtains a Fourier transform of J $(x,y,z_o)$ and under certain conditions for F, the Fourier transform of J splits up into a number of components such that one of them is the frequency-translated Fourier transform of F. Holography seen from this point of view, is analog to modulating a carrier by the message signal at the recording and demodulating the modulated signal at the wavefront reconstruction by band filtering and frequency-translating. It follows from this that any optical recovery or numerical determination of A and $\Psi$ from J by off-axis holography is limited theoretically to fields F whose distribution over some plane $z = z_o$ is band-limited to within $\pm k_o/4$; $k_o = 2\pi/\lambda_o$;

$\lambda_o$; = wavelength of light. The practical realization of this holographic approach to determine A and $\Psi$ shows even more severe restrictions. For more detailed information on the numerical determination of the distribution in space of magnitude and phase of an optical field by off-axis holography, the following text should be referred to: E. Wolf, J. Opt. Soc. of America 60, 18 (1970).

It is an object of the present invention to provide a method and apparatus for numerical determination of the distribution of magnitude and phase of a time harmonic electromagentic, particularly an optical, wave field over a suitable reference surface.

It is another object of the invention to provide a method and apparatus for inversion of the relationship between irradiance J and an unknown field F, i.e. $J = |R+F|^2$, such that the amplitude (A) and phase ($\Psi$) distribution of the field F can be uniquely determined for any given recording point $(x,y,z)$.

These and other objects of the invention are achieved by using the wavefront of a reference wave as the optical reference surface and by introducing additional information to the recording process such that the complex amplitude of the field becomes uniquely determined and this is realized by the recording of three interference fringe patterns which belong to variations of the reference field distribution. A reference field is used whose spatial distribution is similar to the unknown field whereby fringes are obtained the position of which varies slowly with the recording coordinates. The recorded data are numerically evaluated and this may be done conveniently in a computer.

Figure 1B:
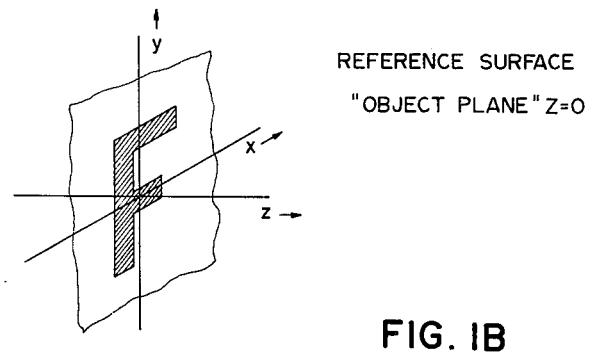
Figure 1C:
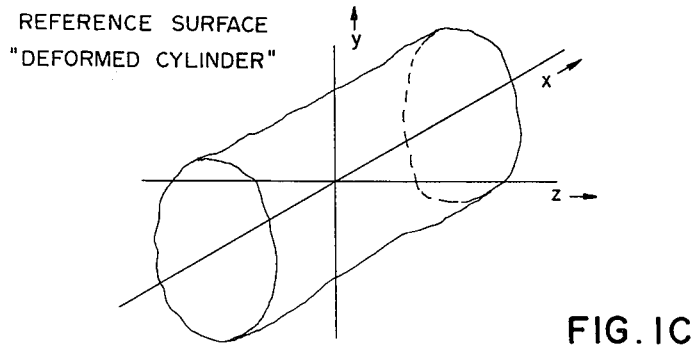
Figure 2:
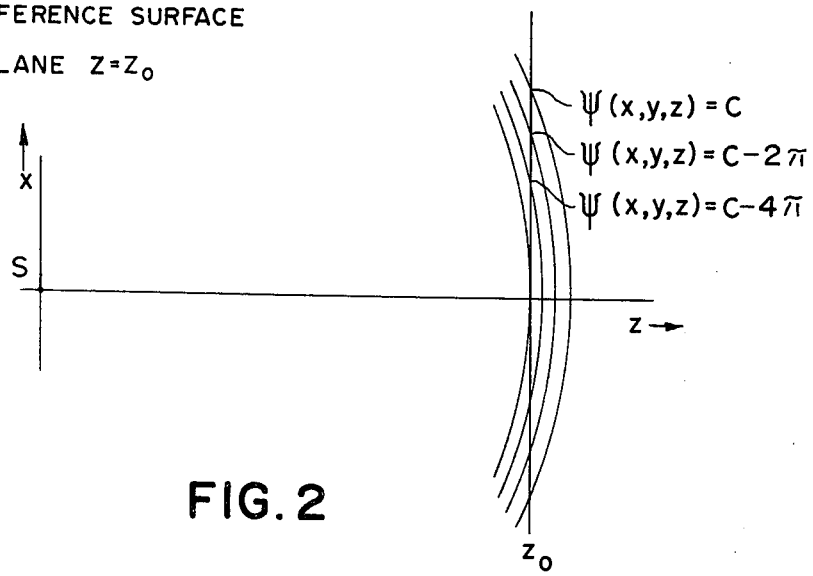
Figure 3:
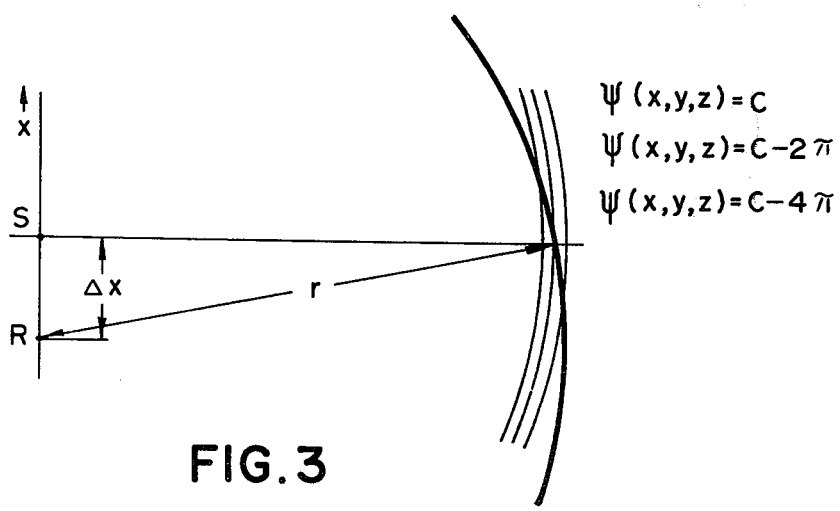
Figure 4:
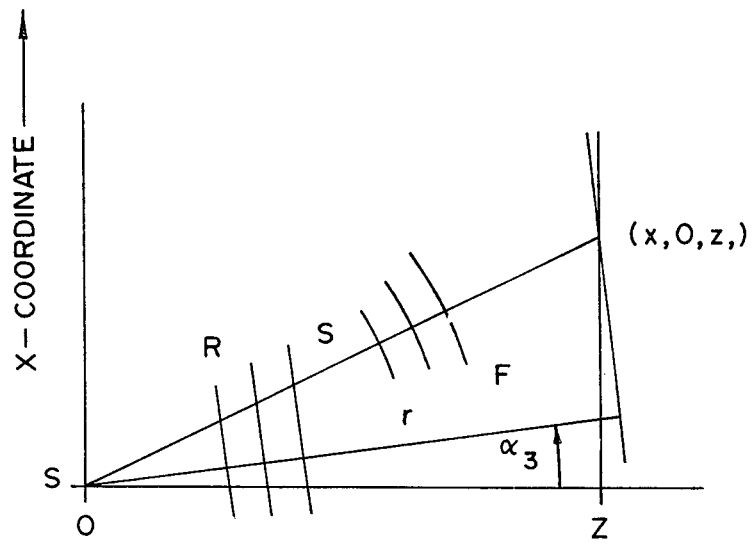
Figure 5:
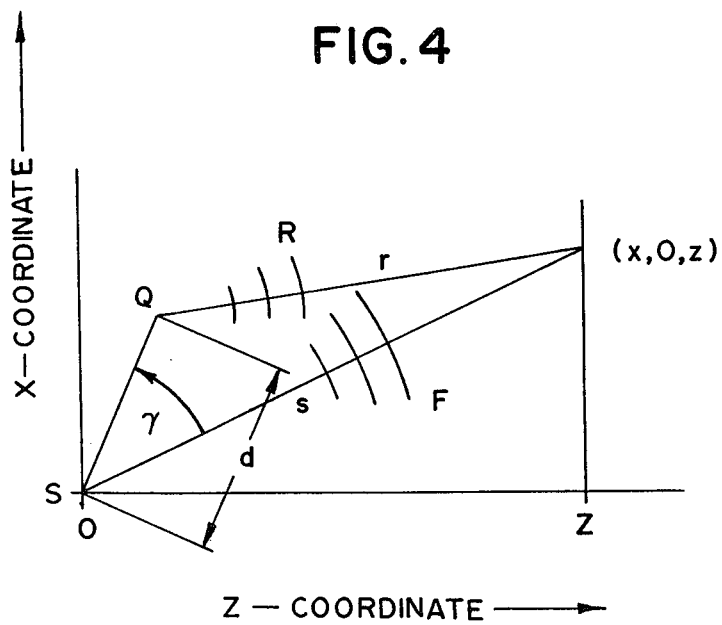
Figure 6:
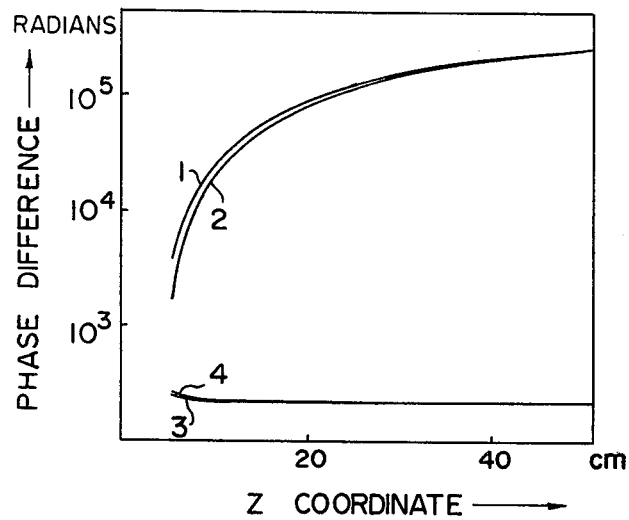
Figure 7:
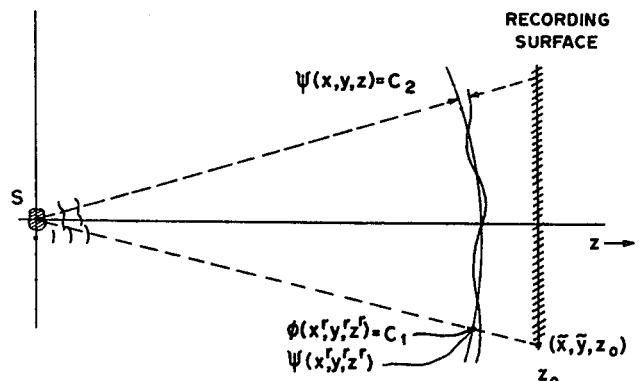
Figure 8:
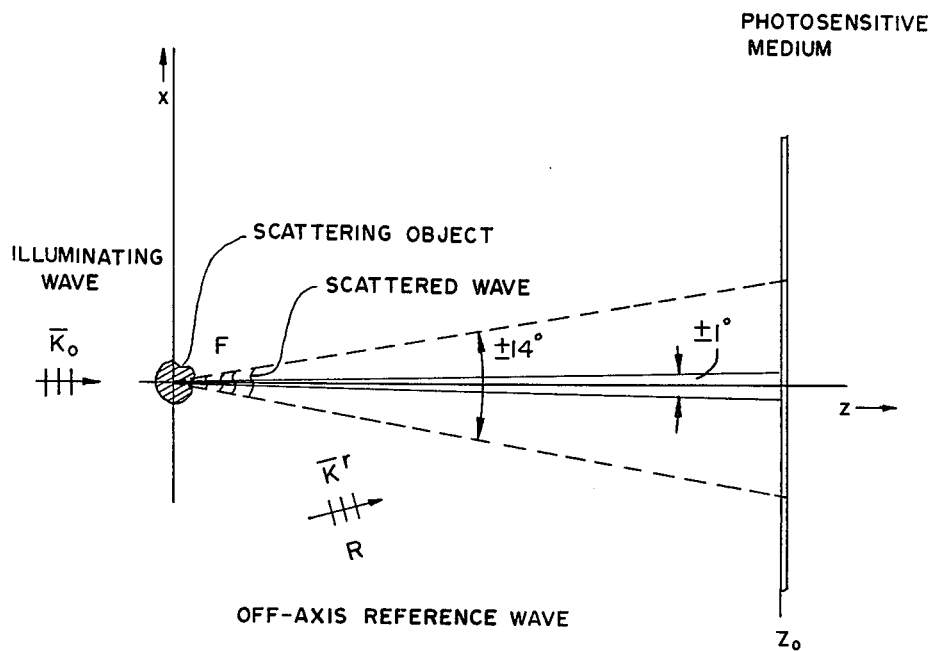
Figure 9:
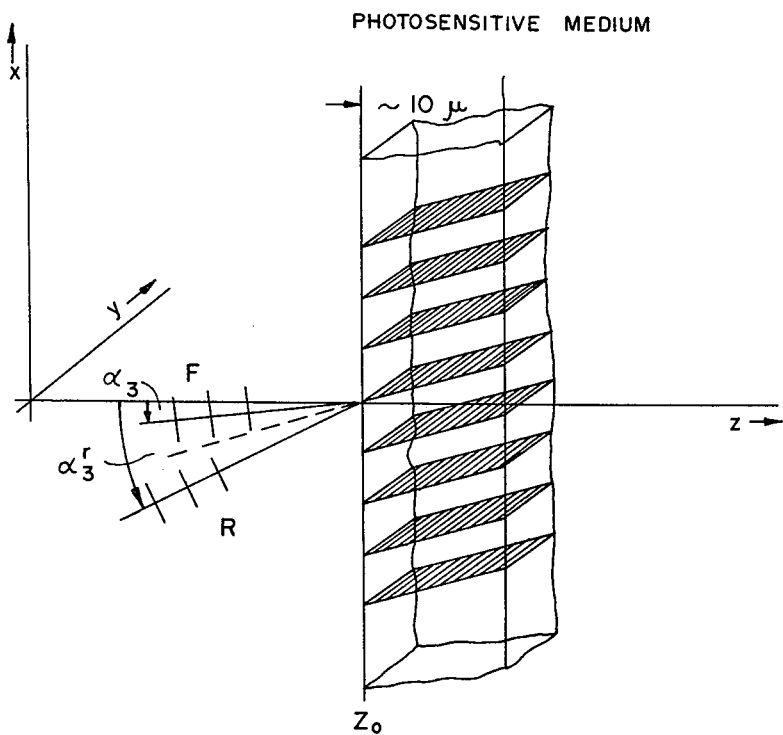
Figure 10:
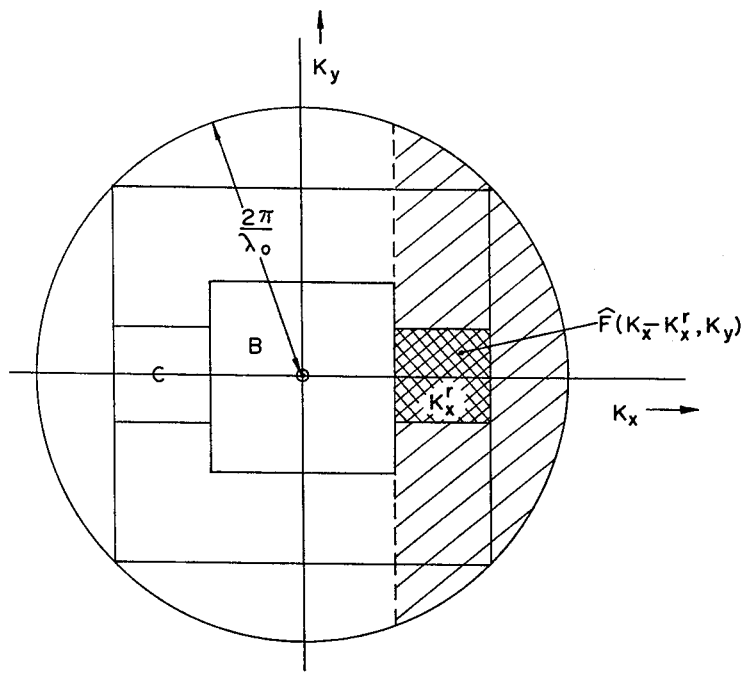
Figure 11:
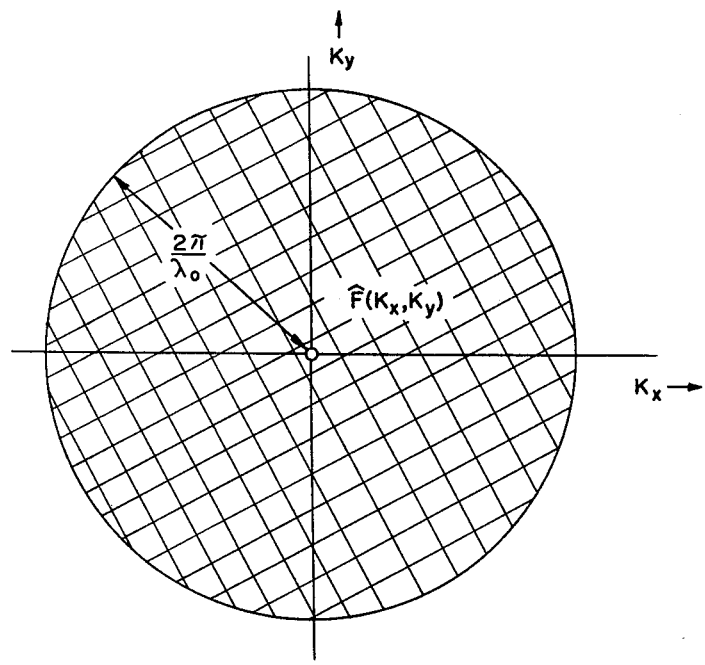
Figure 12:
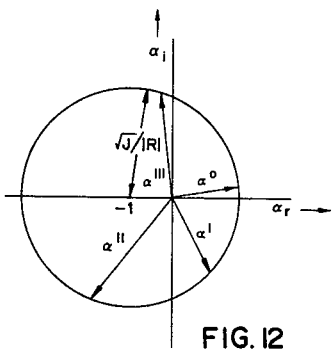
Figure 13:
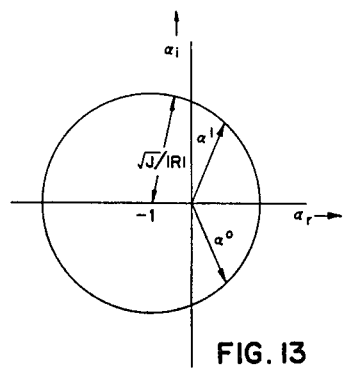
Figure 14:
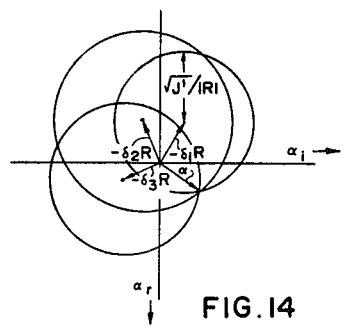
Figure 15A:
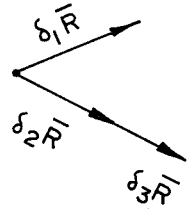
Figure 15B:
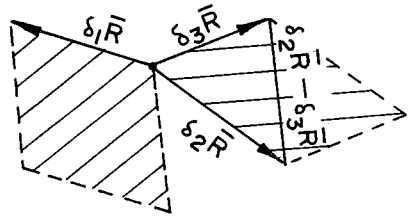
Figure 15C:
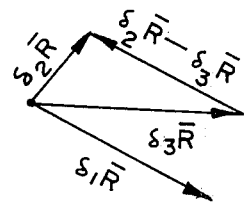
Figure 16:
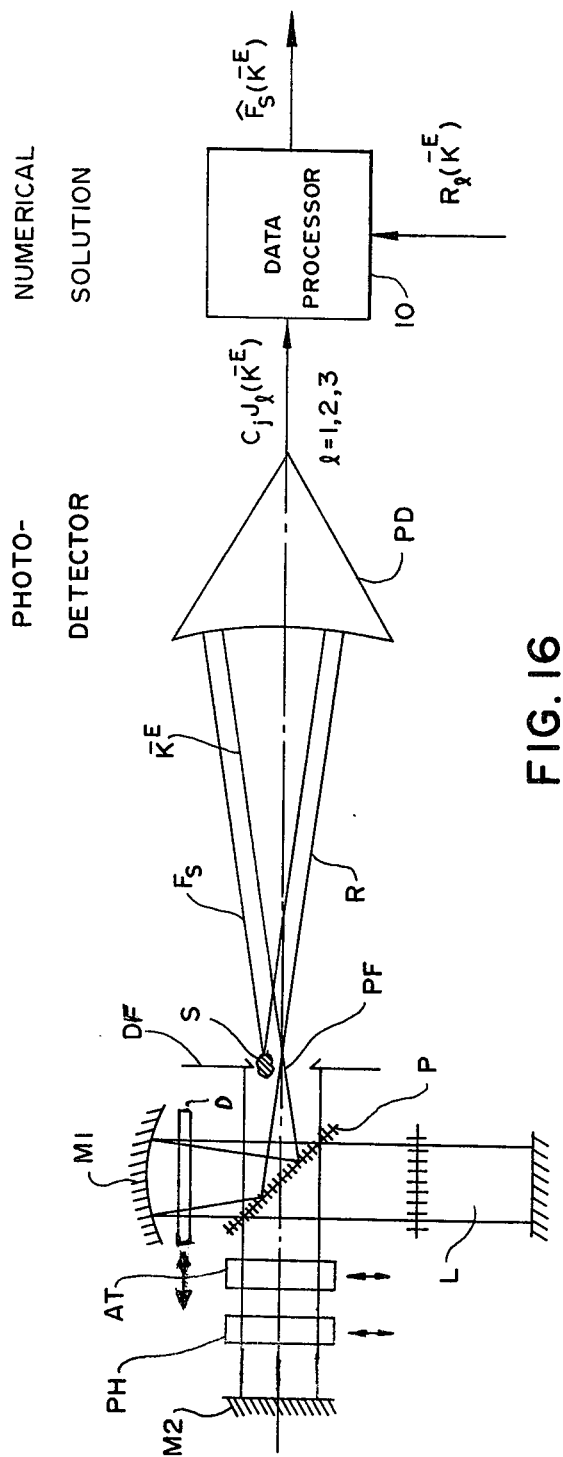
Figure 17:
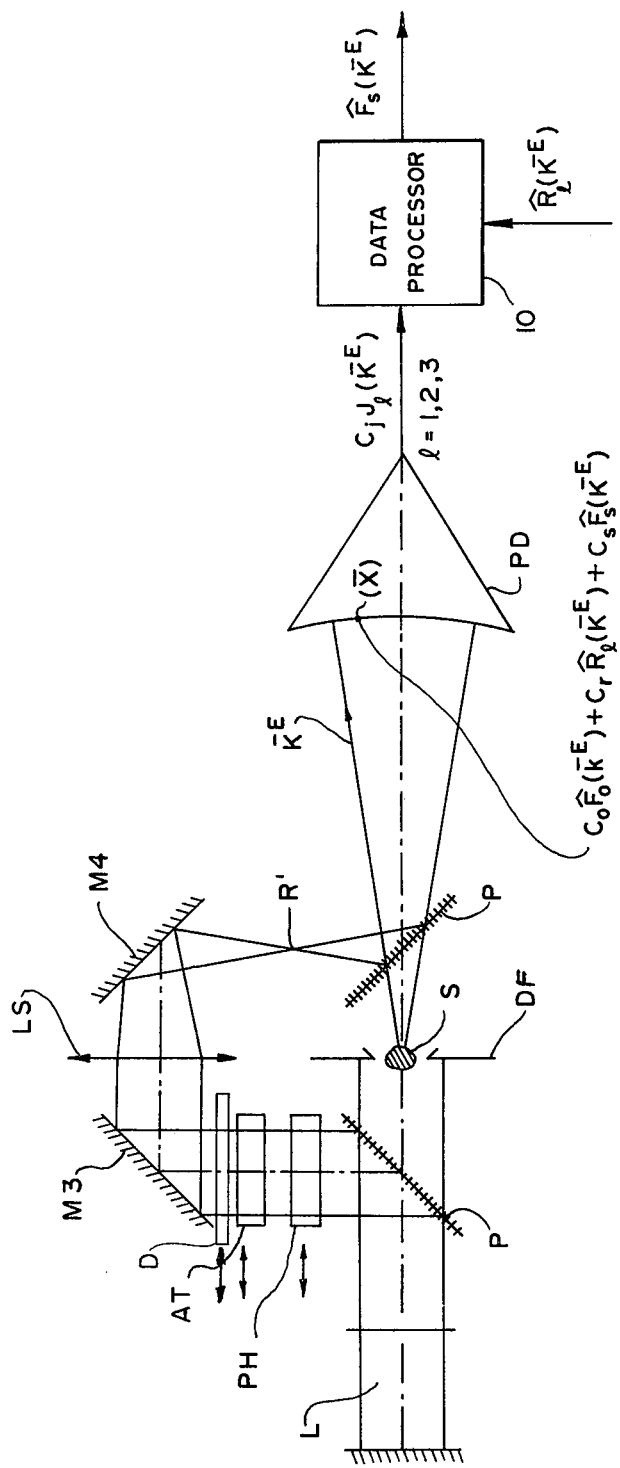
Figure 18:
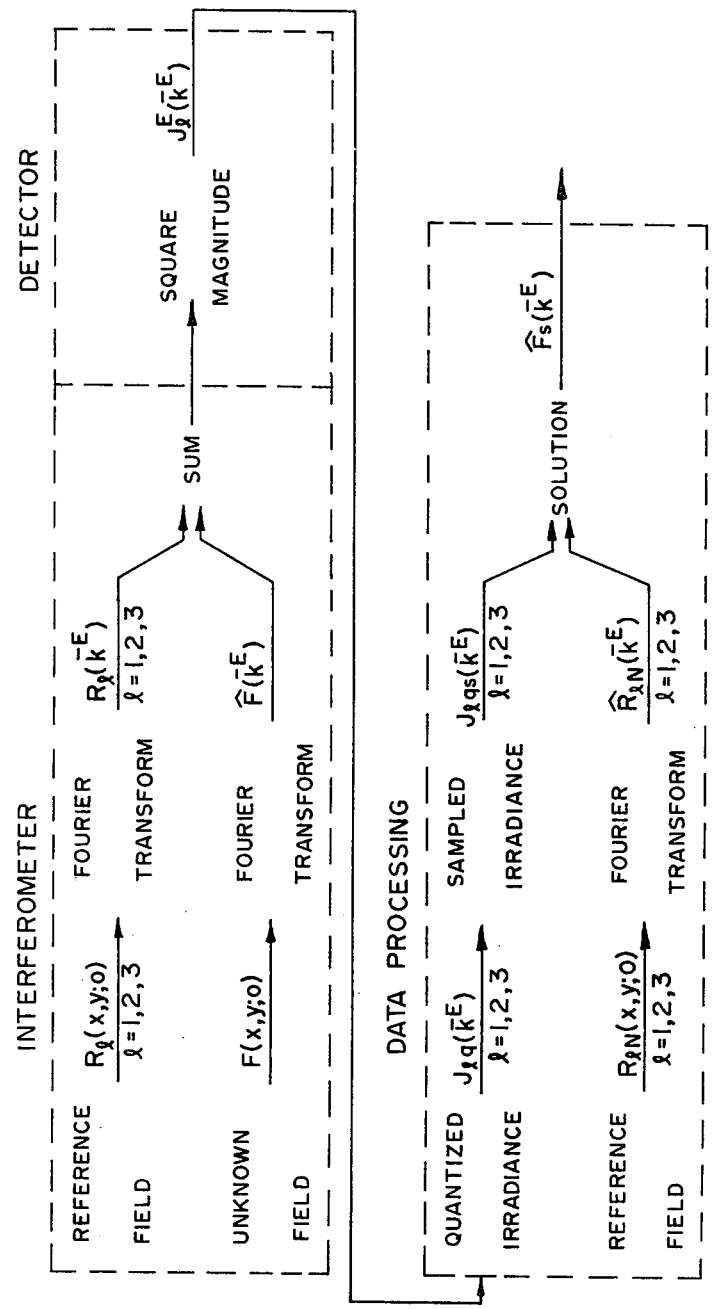
Figure 19:
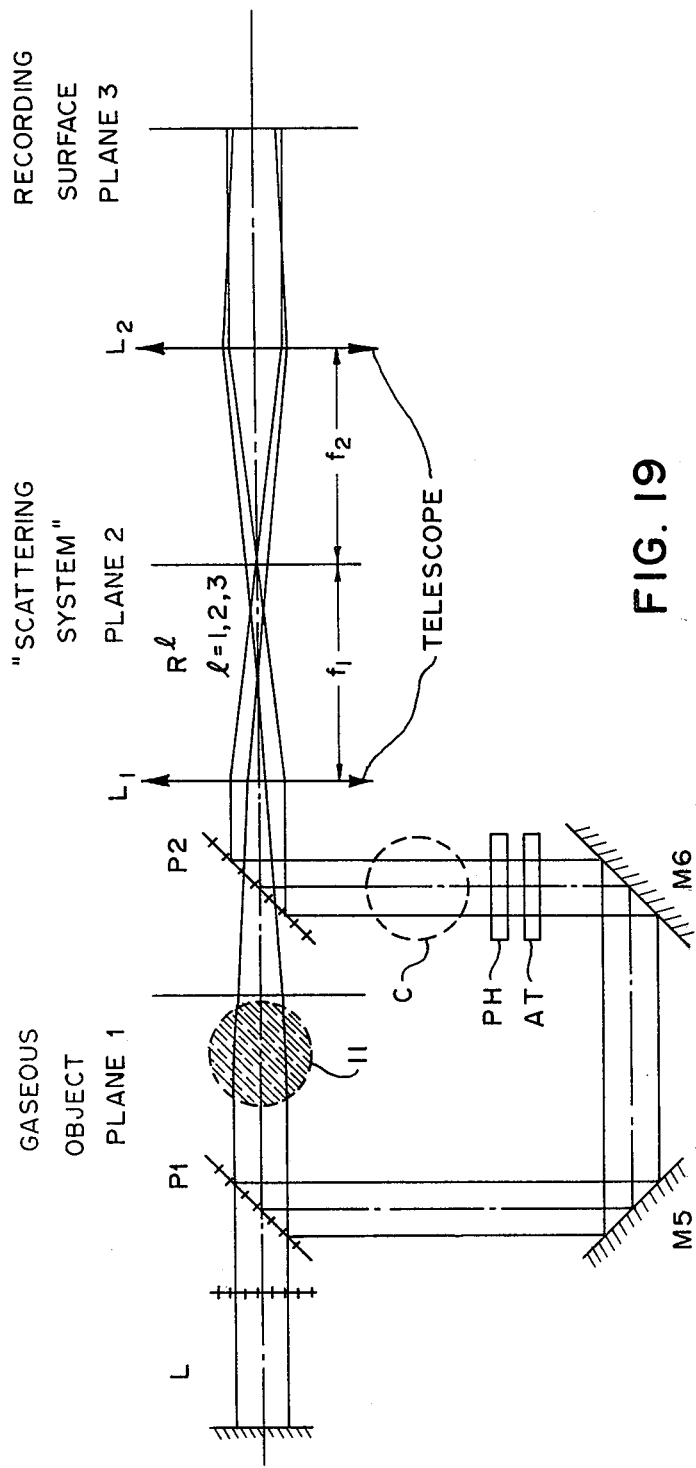
Figure 20:
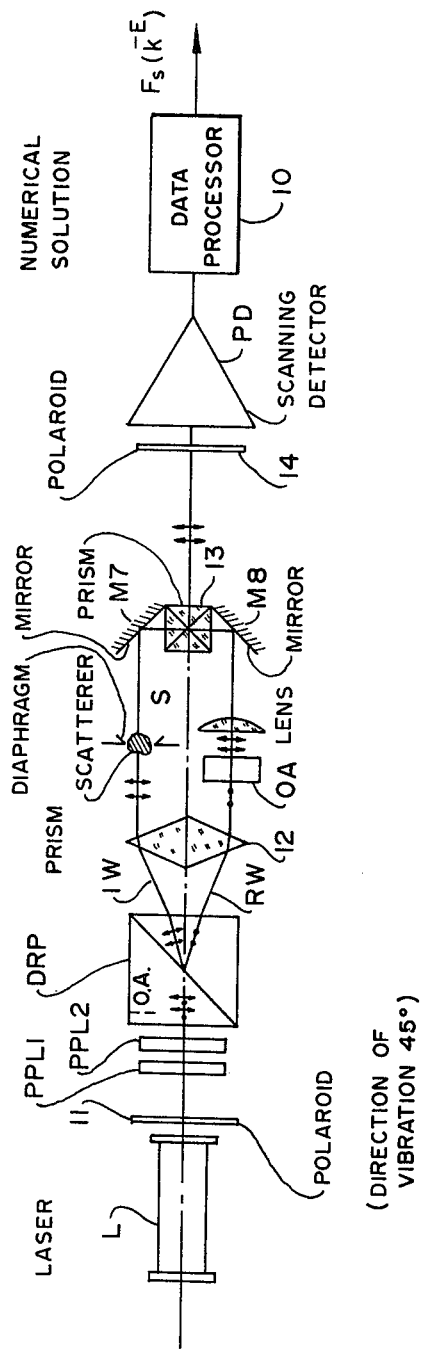
Figure 21:
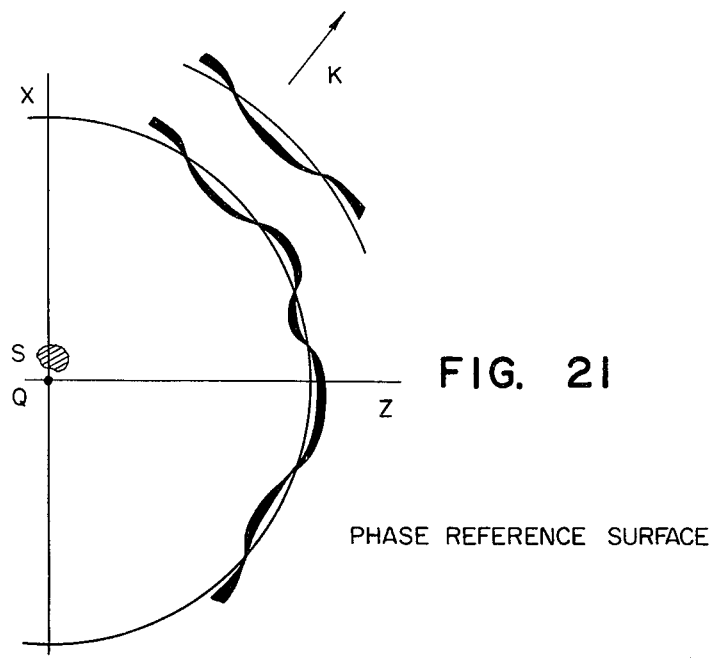
Figure 23:
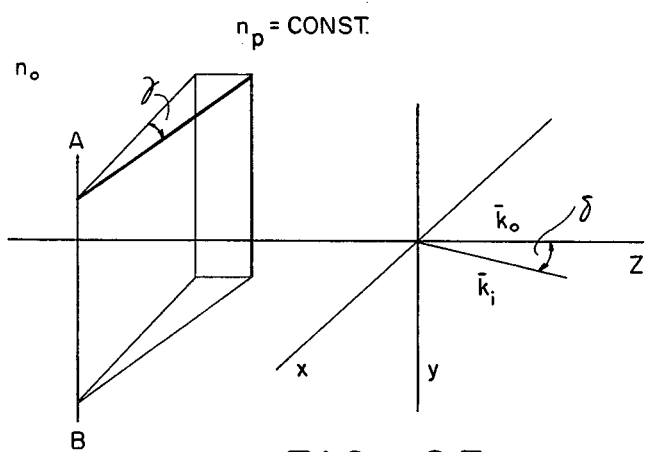
Figure 24:
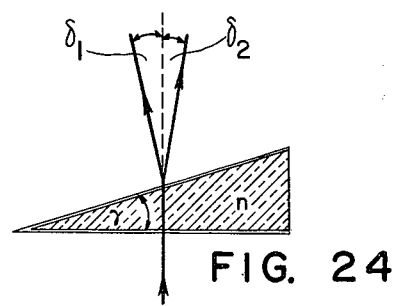
Figure 22:
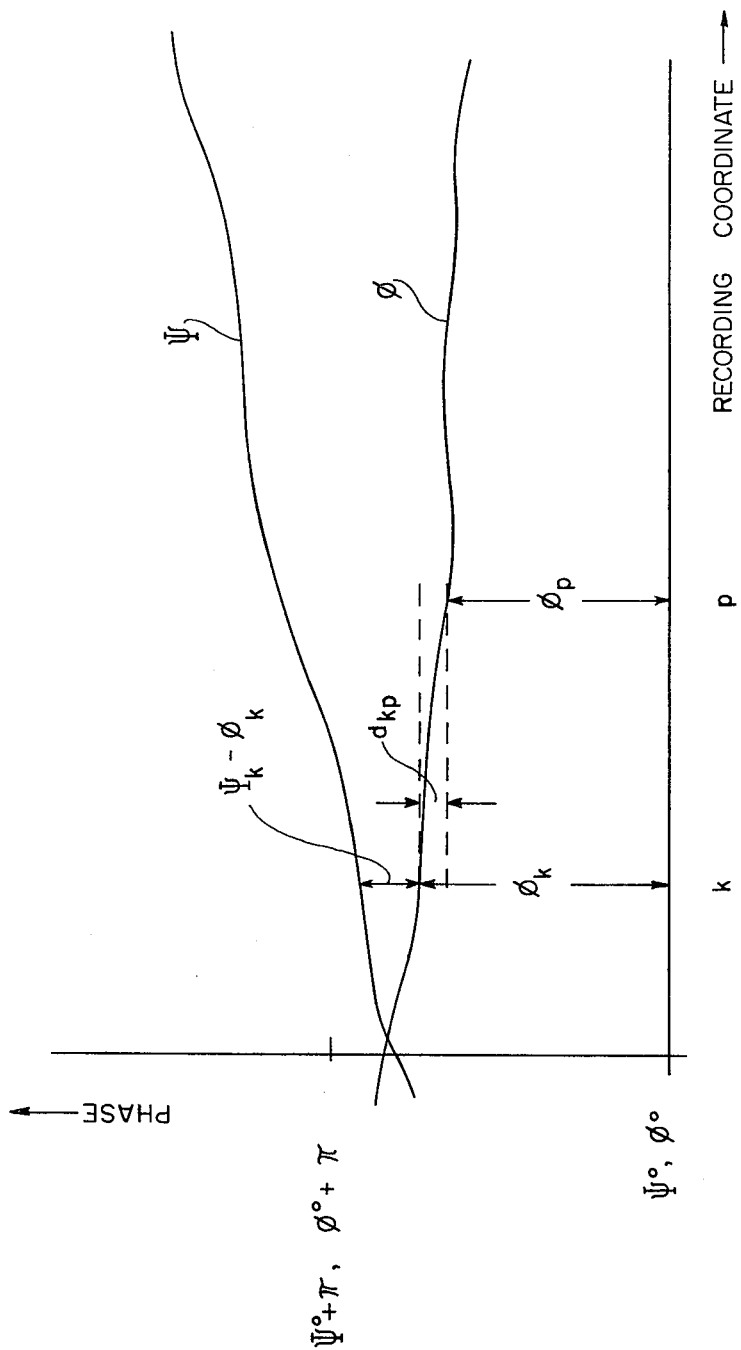
Figure 27:
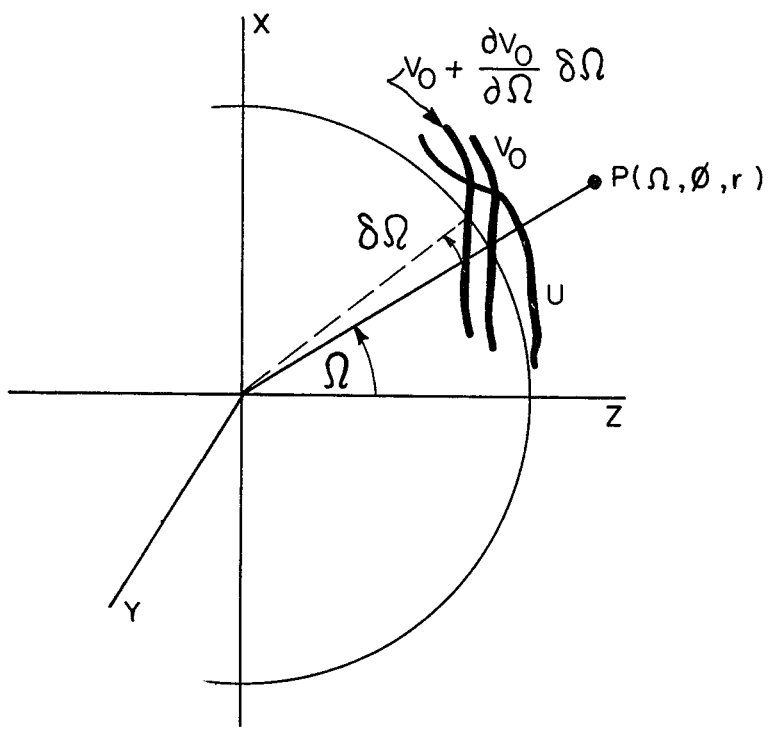

In drawings which illustrate embodiments of the invention:

FIG. 1A, 1B, and 1C are diagrams of types of reference surfaces i.e. sphere, plane and deformmed cylinder, FIG. 2 illustrates the distribution of the phase of a spherical wave over a plane reference surface, FIG. 3 illustrates the distribution of the phase of a spherical wave over an off-axis spherical reference surface, FIG. 4 illustrates the relation between the phases of a spherical wave and an off-axis plane reference wave at the recording point $(x,o,z)$, FIG. 5 illustrates the relation between the phases of a spherical wave and a spherical referencce wave at the recording point $(x,o,z)$, FIG. 6 is a graph of the phase difference between a spherical wave and various reference waves at the recording point $(x,o,z)$ versus the z-coordinate, FIG. 7 illustrates the phase difference between a wave arising from some diffracting object and a spherical reference wave under far-field conditions showing that for large distances of the recording point from both object and reference point source the phase difference approaches a value that depends only on the direction of the straight line interconnecting the object and the recording point, FIG. 8 is a diagram showing the range of off-axis angles within which the distributions of magnitude and phase of scattered waves can be determined using off-axis holography, FIG. 9 is a diagram showing interference fringes obtained by off-axis holography in a 3-dimensional photosensitive medium, FIG. 10 is an illustration of the distribution of lateral spatial frequencies in a hologram obtained by off-axis holography, FIG. 11 is an illustration of the range of lateral spatial frequencies for which magnitude and phase of an object field can be determined by the use of techniques according to the present invention, FIG. 12 is a vector diagram illustrating the ambiguity in amplitude and phase for simple mixing of an unknown wave with a reference wave, FIG. 13 illustrates the ambiguity in the sign of the phasor of the unknown wave when one value only is given of the interferometric irradiance and the magnitude of the unknown wave is known, FIG. 14 is a vector diagram illustrating the unambiguity with which magnitude and phase of the unknown wave are obtained from three-reference interferometry, FIG. 15A, 15B and 15C are vector diagramms giving suitable relationships between the phasors of the three reference waves, FIG. 16 illustrates a possible three-reference holometry system, FIG. 17 illustrates variant three-reference holometry systems, FIG. 18 is a flow diagram of a possible computation system, FIG. 19 illustrates a three reference holometry system for a gaseous or translucent object, FIG. 20 is a system incorporation phase shifting by polarization, FIG. 21 shows a phase reference surface in relation to a typical unknown wavefront, FIG. 22 is a graph showing the effect of a shift of the reference wavefront, FIG. 23 shows a prism acting as a tilting device, FIG. 24 shows a silvered prism giving two reference beam tilts, FIG. 25 is an electro-optical device for beam tilting, FIG. 26A and 26B show a gaseous wedge, and FIG. 27 illustrates in geometrical terms the effect of a shift or tilt of the reference wavefront in relation to the unknown wavefront.

In order to specify the spatial distribution of the unknown field we need to be given its boundary values over some reference surface. Because of the small wavelength of the light both magnitude and phase of an optical field vary rapidly with the spatial coordinates $x,y,z$. These variations may be such that for any given instant of time $t = t_o$ (e.g. $t = o$) the distance between one maximum of the field strength $Re\{F\}$ and the next maximum is of the order of the wavelength of light. Hence the coordinates of such a reference surface must be given within small limits, if a meaningful specification of the complex amplitude F of the unknown field in terms of its boundary values is to be achieved. Often, the coordinates of all points at the reference surface would for this purpose have to be known within limits approximately given by the wavelength of light; it is difficult in practice to meet such a requirement using the surface of a material detection device. In addition, the geometrical form of the reference surface determines the way in which the field strength varies with the coordinates of the surface. If we can provide a reference surface that matches closely one of the wavefronts ($\Psi$ = constant) of F, the phasor F will vary much less over this surface than if otherwise many wavefronts ($\Psi = C_m; C_m = C \pm m2\pi; m = 1,2,3$), would intersect with the reference surface chosen. FIG. 1A, 1B and 1C illustrate possible reference surfaces i.e. the surface of a sphere centered at the origin of the coordinate system, an object plane with $z = o$ and a deformed cylinder. These examples of possible reference surfaces demonstrate that for purposes of the invention to be described more fully below they may have an arbitrary spatial distribution, in fact a non-homogeneous reference wave as exemplified by 1B might be used for certain purposes. FIG. 2 explains the situation when the distribution of the phase over a plane reference surface $z = z_o$ is considered which results from a spherical wave arising from the origin $x = y = z = o$. A much less rapidly varying phase distribution is obtained if the reference surface chosen is another sphere centered at some point close to the origin. This is shown in FIG. 3 where the spherical reference surface is centered at some point Q offset by a small distance $\Delta x$ from the point of origin S of the wave to be measured.

The problem of a suitable reference surface is closely related to the aim of the present invention which may be designated as "holometry" and which is the numerical determination of the distribution of the phase as well as magnitude of an unkown electromagnetic field over a reference surface.

The geometry of the reference surface must be known within limits small enough to be able to specify, in a meaningful way, the distribution F over the reference surface. The form of the reference surface should possibly be chosen such that slow fluctuations of F over the surface are obtained. When it is required to evaluate some experimentally determined distribution $F = A \ exp \ [j\Psi]$, one geometrical form of the reference surface may prove itself more suitable than others from the point of view of the conditions to be met, for example, to find magnitude, relative phase, and position of a number of sources distributed in three dimensions of the field F, the reference surface is preferably to have the form of a sphere (of large diameter) such that the field sources become located in the central region of the sphere. If a plane is chosen as a reference surface it is usually more difficult to determine the searched-for spatial distribution of these field sources than it is with a spherical reference surface. An examination of FIGS. 2 and 3 indicates one reason for this, which is the more rapid variation of the phase of the field F over the plane reference surface than over the spherical reference surface.

The problem of providing a useful reference surface can be solved by an interferometric procedure according to the present invention to be explained more fully below provided the unknown wave is made to interfere three times with a reference wave whose spatial distribution is similar to the unknown wave. Referring to FIG. 4 the prohibitive effect which the rapid variation of the difference of the phase of two waves F and R can have on a useful interpretation of interferometric data may be shown for the simple case where it is intended to determine the phase difference $\Psi_o - \phi_o = \Psi(o,o,o) - \phi(o,o,o)$ of a spherical wavelet F arising from a point source S at the origin by making this wavelet interfere with some plane wave R and recording the resulting interference fringe pattern over the plane $z$=const. Writing for the spatial distribution in two dimensions $x$ and $z$ of these scalar fields $$F(x,z) = exp \ [j\Psi(x,z)] = exp \ [j\{\Psi_o + \lambda k_o z(1+(x/z)^2)^{1/2}\}]$$

$$R(x,z) = exp \ [j\phi(x,z)] = exp \ [j\{\phi_o + k_o(x sin\alpha_o + \lambda z cos\alpha_o)\}]$$

the fringe pattern $J(x,z)$ is obtained:

$$J(x,z) = |1 + exp[j(\Psi-\phi)]|^2 \qquad (10)$$

Any method used to evaluate this fringe pattern e.g. off-axis holography, will yield the phase difference $$\Psi-\phi=\Psi_o - \phi_o + k_o\{z(1 + (x/z)^2)^{1/2} - x\sin\alpha_3 - z\cos\alpha_3\} \quad \Psi_o-\phi_o\Delta(x,z,\alpha_3) \qquad (11)$$

where $\Delta(x,z,\alpha_3) = k_o(s-r)$ denotes the "geometrical part" of the phase difference and $\Psi_o-\phi_o$ its "source dependent part" FIG. 6, plots 1 and 2 show $\Delta(z,z,\alpha_3)$ versus the longitudinal recording coordinate $z$. (Plot 1, $x = 1.0$ cm; plot 2, $x = 1.2$cm. off-axis angle $\alpha_3 = 18°$; see FIG. 4). $\Delta(x,z\alpha_3)$ depends sensitively on the recoring coordinates $x,z$, and the off-axis angle $\alpha_3$ of the plane reference wave. In order to find the value of $\Psi_o-\phi_o$ mod. $2\pi$ from $J(x,z)$ it would be necessary to know these coordinates e.g. the values of $z$ within fractions of the wavelenglth of light except for very small values of $x/z$.

Referring to FIG. 5 it will be seen that if it is assumed that the reference wave has a spatial distribution $R(\bar{x})$, which is approximately the same as $F(\bar{x})$, a different situation is obtained. In this case F is some spherical wave and the reference wave R is another spherical wave which arises from the source Q, the location of which relative to S is given by the distance d and some angle $\gamma$. The geometrical part of the phase difference $\Psi-\phi$) may be shown to be given by $$\Delta(x,z,d, \cos\gamma) = k_o(s-r) = k_o\{x^2+z^2)^{1/2} - (d^2+x^2+z^2-d(\cos\gamma)(x^2+z^2)^{1/2})^{1/2}\} \qquad (12)$$

The dependence of $\Delta(x,z,d, \cos\gamma)$ on the recording coordinates $x,z$ becomes rather slow if the recording is done under far field conditions. This is illustrated by plots 3 and 4 of FIG. 6 for F arising from point $S=(o,o,o)$ and R arising from the point $Q=(26\mu m, o,15\mu m)$; plot 3, $x = 1.0$ cm.; plot 4 $x = 1.2$ cm; see FIG. 5. For large $z$, the function $\Delta$ approaches asymptotically the expression $(\Delta_f)$ $$\Delta_f(x,z,d,\cos\gamma) = k_o d \cos\gamma \qquad (13)$$

In comparison to the expression for $\Delta(x,z,\alpha_3)$ as given by equation (11) $\Delta_f(x,z,d,\cos\gamma)$ as given by equation (13) does not contain any longer the recording coordinates $x,z$ multiplied by $k_o$. Hence the dependence of $\Delta_f$ on $x,z$ is rather slow and can be made arbitrarily slow by choosing $d$ to be small.

For the majority of waves of practical interest (waves diffracted by optical elements or physical objects), however, an arrangement of photosensitive material cannot be brought about with sufficient precision such that its recording surface would meet the requirements to be placed upon a reference surface. For example, if it is desired to determine the distribution of A and $\Psi$ over a spherical surface, this would require a photodetector system (e.g. an array of photodiodes) the elements of which from the inner surface of a sphere whereby they deviate from the precise mathematical sphere only by fractions of the wavelength $\lambda_o$ of the light and this is clearly not feasible.

The present invention proposes the substitution of an optical wavefront for a material reference surface. This allows the use of the high precision with which optical wavefronts are available due to the high spatial coherence obtained from a laser source. The theoretical thickness of such an optical reference surface is zero. In practice, this thickness is given by the limits of tolerance with which the wavefront $\phi =$ const. of the reference wave is known. The limits of tolerance in absolute terms with which the wavefront $\Psi =$ const. of the unknown wave field is obtained from holometry is given by the tolerance available for the reference wave plus the limit of accuracy at the holometric determination of $\alpha$, in particular of the phase $\Psi-\phi$ of $\alpha$. Referring to FIG. 7 it will be shown how this use of an optical wavefront as a reference surface can be achieved. The wave field $F = Aexp[j\Psi]$ to be determined is mixed interferentially with some reference field $R = Bexp[j\phi]$. Then for large distances from the scattering system and/or for small scattering angles of waves arising from each source point we can obtain "far-field conditions" such that the phase difference $$\Delta(x,y,z) = \Psi(x,y,z) - \phi(x,y,z)$$

varies only very slowly with $x,y,z$ and consequently the fringe $J(x,y,z)$ also varies slowly with $x,y,z$. Under these conditions it is simple to transform the value of $\alpha(\bar{x},\bar{y},z_o)$ which is obtained by three-reference interferometry (to be described more fully below) at a point $\bar{x},\bar{y},z_o$ on some recording plane $z = z_o$ to obtain the distribution $\alpha(x^r, y^r, z^r)$ of magnitude and phase of $\alpha$ over a surface $\phi(x^r, y^r, z^r) =$ const. that is over some wavefront of the reference wave. Thus the following transform can readily be carried out:

$$\alpha(\bar{x},\bar{y},z_o) \rightarrow \alpha(x^r,y^r,z^r) = \frac{A(x^r,y^r,z^r)}{B(x^r,y^r,z^r)} \exp[j(\Psi(x^r,y^r,z^r)\text{-const.})] \qquad (14)$$

This yields $A(x^r,y^r,z^r)$ and $\Psi(x^r,y^r,z^r)$ except some constant phase factor $\exp[j\text{ constant}]$ which does not matter. The coordinates $x^r,y^r,z^r$ are under far-field conditions defined by $\phi(x^r,y^r,z^r) =$ const.

It is important to note that under the conditions mentioned above the transformation $\alpha(\bar{x},\bar{y},z_o) \rightarrow \alpha(x^r,y^r,z^r)$, equation (14), does not require one to know the values of either the coordinates $\bar{x},\bar{y},z_o$ of the recording point or the coordinates $x^r,y^r,z^r$ of the corresponding point on the wavefront of the reference wave with particular accuracy. A mapping of the points of the surface of a sphere onto a recording plane may for example have to be done but the conditions for $\alpha$ are such that $\alpha$ does essentially not vary when this transformation of the coordinates is carried out. This is because the phase difference $\Delta$ varies slowly with $x,y,z$, under "far-field" conditions. Further to be noted is that while $\Delta$ does not vary essentially with $x,y,z$ under far-field conditions, $\phi(x,y,z)$ varies rapidly such that the coordinates $x^r,y^r,z^r$ of the surfaces $\phi(x^r,y^r,z^r) =$ const. are known with high accuracy such that by determining $A(x^r,y^r,z^r)$ and $\Psi(x^r,y^r,z^r)$ one may in fact obtain field distributions over a reference surface, the coordinates of are given with high accuracy. In addition, since the geometrical form of the wavefronts $\phi(x^r,y^r,z^r) =$ const. of the reference field are entirely arbitrary, optical reference surfaces can be found to match aproximately the wavefronts $\Psi(x,y,z) =$ const. of any wave field to be determined.

In holography the reference surface is given by a photographic plate or some other layer of photosensitive medium; at the wavefront reconstruction by holography, the boundary values over this surface determine the reconstructed field. Holography always takes this reference surface (= recording surface) to be a plane. Holography does not therefore make a determination of the distribution of A and $\Psi$ over a surface defined by the wavefront of a reference field. Rather it is found to take as the reference surface the plane which is given by the physical recording layer and which, because of this, is given by a "thick" system and hence yields a rather ill-defined reference surface. Off-axis holography in order to separate the field F from the "spurious terms" contained by the Fourier transform of the fringe J, requires further that the distribution of the reference field over the recording plane is precisely sinusoidal. This is analog to the requirement that with amplitude modulation transmission the carrier must be a sinusoid if phase and frequency distortions are to be avoided.

Magnitude and phase distributions of optical fields have been numerically determined by off-axis holography but only for fields whose wave propagate within a certain small angle cone about the optical axis (bandlimited field distributions) as illustrated in FIG. 8. This fact limits the numerical aperture of observation and consequently the resolution power. The aperture of this angle cone is limited theoretically to ±14°. Apertures of less than 1° have been realized for the determination of the distribution of the refractive index within a thin glass wedge (W. H. Carter, J. Opt. Soc. Am. 60, 306 (1970)). This discrepancy between theoretical limit and practical achievement is partly caused by a number of difficulties arising with the off-axis holographic way of recording the fringes $(J(x,y,z))$. For any off-axis holographic recording the irradiance $J(x,y,z) = F+R^2$ is distributed in $x,y,z$ in a way such that on developing the film, striae of the extinction (or absorption per length) are formed in the photographic layer, the inclination of which relative to the $z$-direction (=optical axis) depends on both the off-axis angle $\alpha^r{}_3$ of the reference wave and the angle $\alpha_3$ under which the unknown wave F is incident at the particular point $(\bar{x},\bar{y},z_o)$ of the recording material. FIG. 9 illustrates this for the simple case of F being a plane wave. It is obvious that the photometric evaluation of these striations is made difficult by the fact that these striae are inclined relative to the $z$-direction. A further serious problem is to read the date obtained from off-axis holography in terms of the physical properties of the scatterer i.e. its refractive index distribution. This is due to the fact that in off-axis holography the (ideal) reference surface is always the plane $z = z_o$ which renders the obtained values of magnitude and phase of $F(\bar{x},\bar{y},z_o)$ to be very sensitive functions of the recording coordinates $\bar{x},\bar{y},z_o$.

FIG. 10 is a diagram showing the overall range of lateral spatial frequencies $(k_x,k_y)$ of transmitted optical fields (a circle of radius $2\pi/\lambda_o$) and the portion of this range (cross-hatched portion i.e. approx. 1/16 of the whole) available to the object field using off-axis holographic techniques. This occurs because of the need to to separate the spectral density $\hat{F}$ (=Fourier transform of of $F(\bar{x},\bar{y},z_o)$) from the spurious terms $(B + C)$ which are always part of the off-axis holographic fringe pattern $J(\bar{x},\bar{y},z_o)$. The rest of the range is unavoidably wasted by background B and complementary image C. To special types of object fields the coarsely-hatched portion is available. FIG. 11 is a comparable diagram indicating that with holometry the full range of lateral spatial frequencies $(k_x,k_y)$ of transmitted optical fields may be occupied by the object field. The reason for this is that separation of the field F from the spurious terms or the inversion of equation (1) is obtained in a way to be described below different from holography such that no modulation of the object field is required.

Referring to FIGS. 12, 13 and 14 it will now be shown that by using three reference waves rather than one, it is possible to determine the value of the phasor $\alpha$ at any given point of observation and that this can be achieved in a way such that the possibility is retained of choosing a reference field $R(\bar{x})$ so as to approximately match the spatial distribution of some arbitrary object field $F(\bar{x})$ in particular so as to approximately match the distribution of the phase of $F(\bar{x})$. As described in the introduction FIGS. 12 and 13 illustrate the ambiguity in the determination of the phasor $\alpha$ when standard interferometric or holographic techniques are used. A certain relation merely is established between A and $\Psi$ by mixing the unknown wave F with a reference wave R, namely that the tip of the phasor $\alpha = F/R$, if drawn from the origin of the phasor plane must lie on a circle which is centered at the point $-1$ and has the radius $\sqrt{J}/|R|$. FIG. 14 indicates that if three properly chosen references $R_1, R_2, R_3$ are utilized then then ambiguity may be resolved.

Magnitude and phase (apart from integer multiples of $2\pi$) of the ratio $\alpha = F/R$ at some recording point can be obtained by varying the reference field in some known way while the field to be determined is kept constant. Three different fringe patterns $J_1, J_2, J_3$ which belong to the three reference $R_1, R_2, R_3$ are recorded. These reference fields may be written alternatively:

$$R_l = (\delta_l R)R \qquad = ((\delta_l B)exp$$
$$[j\delta_l\phi])R = (\delta_l B)B(exp[j(\delta_l\phi+\phi)]) \qquad (15)$$

with $l = 1,2,3$ $R(\bar{x})$ may still be any arbitrary distribution which is known or is taken as a reference. $\delta_l B$ and $\delta_l \phi$ may or may not be functions of the coordinates $(\bar{x})$ as long as they are known. The relation of equation (1) above may be extended to include the variational elements $\delta_l R$ of the reference field:

$$J_l = |(\delta_l R)R + F|^2 = |R|^2 |(\delta_l B) \exp [j\delta_l\phi] + \alpha|^2 \qquad (16)$$

FIG. 14 shows that in this case $\alpha$ (or F) is defined by the intersection of three circles in the phasor plane. The radius of each circle is given by $(J_l)^{1/2}/|R|$ (or alternatively $(J_l)^{1/2}$) and each circle is shifted out of the origin of the phasor plane by the amount $-\delta_l R = -(\delta_l B) \exp [j\delta_l\phi]$ (or alternatively $-R_l = -(\delta_l R)R$). This follows from the identy:

$$J_l = |R|^2 |\delta_l R + \alpha|^2 = |R|^2\{(\delta_l R_r + \alpha_r)^2 + (\delta_l R_i + \alpha_i)^2\} \qquad (17)$$

or alternatively from $$J_l = |R + F|^2 = (R_{lr}+F_r)^2 + (R_{li}+F_i)^2 \qquad (18)$$

where the subscripts r and i denote real and imaginary parts respectively of the complex quantities $\delta_l R$ or $R_l$, $l = 1,2,3$. For example $\delta_l R_r = (\delta_l B) \cos(\delta_l\phi)$; $R_{lr} = (\delta_l B)B(\cos(\delta_l\phi+\phi))$.

The three equations represented by equation (17) determine uniquely the unknowns $\alpha_r$ and $\alpha_i$ provided the the set of numbers $\delta_l R_r$, $\delta_l R_i$, $l = 1,2,3$ satisfies one of certain conditions to be developed below. The three equations may be written in the form:

$$K_1 = \frac{J_1}{|R|^2} - (\delta_1 R_r)^2 - (\delta_1 R_i)^2 = (\alpha_r)^2 + (\alpha_i)^2 + 2(\delta_1 R_r)\alpha_r + 2(\delta_1 R_i)\alpha_i \quad (19)$$

$$K_2 = \frac{J_2}{|R|^2} - (\delta_2 R_r)^2 - (\delta_2 R_i)^2 = (\alpha_r)^2 + (\alpha_i)^2 + 2(\delta_2 R_r)\alpha_r + 2(\delta_2 R_i)\alpha_i \quad (20)$$

$$K_3 = \frac{J_3}{|R|^2} - (\delta_3 R_r)^2 - (\delta_2 R_i)^2 = (\alpha_r)^2 + (\alpha_i)^2 + 2(\delta_3 R_r)\alpha_r + 2(\delta_3 R_i)\alpha_i \quad (21)$$

and by substracting (20) from (19) and (21) from (20) the following linear equations are obtained:

$$\tfrac{1}{2}(K_1 - K_2) = (\delta_1 R_r - \delta_2 R_r)\alpha_r + (\delta_1 R_i - \delta_2 R_i)\alpha_i \quad (22)$$

$$\tfrac{1}{2}(K_2 - K_3) = (\delta_2 R_r - \delta_3 R_r)\alpha_r + (\delta_2 R_i - \delta_3 R_i)\alpha_i \quad (23)$$

The terms $\alpha_r$ and $\alpha_i$ can be solved for provided the determinant of this linear system is not zero:

$$(\delta_1 R_r - \delta_2 R_r)(\delta_2 R_i - \delta_3 R_i) - (\delta_2 R_r - \delta_3 R_r)(\delta_1 R_i - \delta_2 R_i) \neq 0 \quad (24)$$

To be able to understand the condition of equation (24) a vector notation for the phasors is adopted:
$$\delta_l \overline{R} = (\delta_l R_r, \delta_l R_i)$$

Defining a two-dimensional vector cross product in the usual way for example by setting:

$$\delta_2 \overline{R} \times \delta_3 \overline{R} = (\delta_2 R_r)(\delta_3 R_i) - (\delta_2 R_i)(\delta_3 R_r)$$

equation (24) can be put in the form:

$$\delta_1 \overline{R} \times (\delta_2 \overline{R} - \delta_3 \overline{R}) + \delta_2 \overline{R} \times \delta_3 \overline{R} \neq 0 \quad (25)$$

From this it can be seen that three different cases satisty the condition of equation (24):

$$\delta_1 \overline{R} \times (\delta_2 \overline{R} - \delta_3 \overline{R}) \neq 0 \text{ and } \delta_2 \overline{R} \times \delta_3 \overline{R} = 0 \quad (26a)$$

$$\delta_1 \overline{R} \times (\delta_2 \overline{R} - \delta_3 \overline{R}) \neq 0 \text{ and } \delta_2 \overline{R} \times \delta_3 \overline{R} \neq 0 \text{ but } \delta_1 \overline{R} \times (\delta_2 \overline{R} - \delta_3 \overline{R}) \neq -\delta_2 \overline{R} \times \delta_3 \overline{R} \quad (26b)$$

$$\delta_1 \overline{R} \times (\delta_2 \overline{R} - \delta_3 \overline{R}) = 0 \text{ and } \delta_2 \overline{R} \times \delta_3 \overline{R} \neq 0 \quad (26c)$$

These three cases are illustrated in FIGS. 15a, 15b, and 15c. Generally speaking the variational elements of the reference field must not all be linearly dependent but there may be two such elements linearly depending on each other, if the third is not also linearly depending on the difference of the first two. This can be physically realized by using one attenuator (linearly depending elements) and one phase-shifter (linearly independent elements). This is the situation of FIG. 15a.

FIG. 16 and 17 are physical arrangements for measuring both magnitude and phase of light scattered (coherently) by a mocroscopic object S. Since the wave arising from a microscopic (small) scatterer becomes approximately equal to a spherical wave at large distances from the scatterer, this arrangement beats the scattered wave $F_s$ with an approximately spherical reference wave R. Light emerging from a laser source L is made to illuminate via beam splitter plate P a field stop DF in the opening of which the mocroscopic scatterer S is placed. Also located within the opening of the field stop is the diffraction-limited point focus Q of a microscopic objective lens or focussing mirror M1 such that by beam splitting at P, a coherent reference field R is obtained, the spatial distribution of which over some plane $z=0$ is known. For practical purposes this plane would be selected to be one passing through or near source S and the field stop D. Alternatively, a coherent reference field R may be obtained which has a suitable spatial distribution over the plane $z=0$, if a scattering object (reference object) is inserted whose complex amplitude transmittance is known or taken as a reference. A phase shifting element PH and an attenuator AT are provided to obtain the variational elements $\delta_l R, l = 1,2,3$ of the reference field as required for three-reference interferometry as described above. The arrangement shown here defines the three references as required by equation 26a as illustrated by FIG. 15A. It should be pointed out that the three-reference beams are not used simultaneously but one after the other (consecutively). This means that the phase shifting element and the attenuator are not always positioned in the light path but are moved in and out as required. Suitable mechanical mechanisms (not shown) would effect this as well as the precise location of the various optical elements. The phase shifter and the attenuator may for example take the form of a plane-parallel plate inserted into the collimated beam. These plates could be made out of glass and could be coated with an absorbing and/or phase-shifting layer. The complex amplitude transmittance of these plates i.e. the amount by which they attenuate the transmitted wave and the amount by which they shift the phase of the transmitted wave must be known, however the attenuation can be measured with a photometer and the phase shifting with sufficient accuracy by an interferometer. These plates should be optically smooth, plane-parallel or wedge-shaped in order to yield suitable variations of reference field. Another type of variational elements $\delta_l R = exp\ [-j\overline{k}^{-E} \cdot (\delta_l \overline{x})]$, where $$\overline{K}^E = \frac{\overline{x}_l}{|\overline{x}_l|} K_a.$$

requires that the reference distribution $R(x,y,z)$ is slightly shifted in space say from $x,y,z$ to $x + \delta_l x, y + \delta_l y, z + \delta_l z$; $l = 1,2,3$. This can be obtained by shifting or tilting some optical element, e.g. a lens or a mirror. A shifting is required however, into one direction only and only relative to some initial distribution; this can be accomplished, using e.g. well-known electro-mechanical techniques. Alternatively, a shifting of the reference distribution can also be performed by inserting optical elements into the beam, e.g. a wedge, or by electro-optical means.

It is necessary to provide the spatial distribution $R(x,y,z)$ of the reference field. $R(x,y,z)$ may be taken to be a plane wave as, e.g., in order to study the refraction and absorption by gaseous objects and such a plane wave is available from a laser source. $R(x,y,z)$ may also be taken as an approximate spherical wave by focussing the colimated wave emerging from a laser; this is the distribution most suitable to study microscopic scatterers. In both of the above cases the choice is determined by the requirement to obtain "far-field conditions" for the scattering system such that under feasible recording conditions the reference surface is given by a wavefront of the reference field. Such simple homogeneous reference waves are obtained from ordinary refracting optical elements like wedges and lenses. Many other wave-forming optical elements may be designed to generate reference distributions $R(x,y,z)$, in particular in order to provide non-homogeneous reference waves. For example, 1. refracting elements as, cylindrical lenses, Fresnel lenses, diffusers, elements with coated optical surfaces, refracting arrays made by thin film technique (integrated optics).
2. Reflecting elements as, mirrors, multilayered surfaces, patterned reflecting masks.
3. diffracting elements as, gratings, photographic or synthetic holograms, computer synthetizer complex filters of the binary-mask type or Kineforms.

The arrangement of FIG. 17 differs from that of FIG. 16 in that the optical setup includes morrors M3 and M4 and lens LS so as to provide a virtual reference source point Q'.

The irradiance (time average of magnitude square of field in watts per cm²) of the light is measured by a detector shown in FIGS. 16 and 17 as photodector PD. Since the recording of the three-reference interferometric fringe patterns $J_l$ may be done at some point $\bar{x}_f$ in the far-field region of the scattering system and therefore relatively coarse fringe patterns may be obtained, a scanning recording device of limited spatial resolution power, e.g., an image vidocon may be used for most applications.

The irradiance of the input scattered plane waves (the direction of which is designated by the propagation vector $\bar{k}^E$) is measured point by point by the photodetector and an output related to this i.e., $C_j J_l(\bar{k}^E)$, $l = 1,2,3$ is obtained under far-field conditions. The propagation vector $\bar{k}^E$ is simply related to the position vection $x_f$ of the recording point.

This relation is given by:

$$\frac{\bar{k}^E}{\bar{k}^E} = \frac{\bar{k}^E}{k_o} = (\cos\alpha_1, \cos\alpha_2, \cos\alpha_3) = \frac{\bar{x}_f}{} \quad (27)$$

where $\alpha_1, \alpha_2, \alpha_3$ are the angles between $\bar{k}^E$ and the $x$-, $y$-, $z$-axis respectively. Three conditions to the total field at a recording point $(\bar{x})$ have to be considered: $F_s$, the field scattered by the micro-object; $F_o$, the field due to illumination and diffraction of the illuminating wave at the field stop; and the reference fields $R_l = (\delta_l R)R$, $l = 1,2,3$. It can be shown that these may be defined as follows:

where $\hat{F}_s(\bar{k}^E)$, $\hat{F}_o(\bar{k}^E)$, and $\hat{R}(\bar{k}^E)$ are Fourier transforms, for spatial frequencies $\bar{k} = \bar{k}^E$, of the respective distributions in two or three spatial dimensions (volume $v$ of the scatterer or surfaces $s$ and $r$, over which the field distributions $F_o$ and $R$ may be defined). $n(\bar{x})$: the distribution of the refractive index. $\bar{n}$: the vector of the normal to the respective surface. The quantities $\hat{F}_s(\bar{k}^E)$, $\hat{F}_o(\bar{k}^E)$ and $\hat{R}(\bar{k}^E)$ express the magnitude and phase of plane waves of given propagation vector $k^E$ at the origin of the $x,y,z$-coordinate system.

The factors $C_o$, $C_s$, and $C_r$ which occur in equation (28), (29), and (30) contain the "geometrical part" of the phase, namely the exponential function $exp [jk_o|x_f|]$, which varies rapidly with the coordinates. However this function is common to all fields considered and at taking the magnitude by the photodetector), it drops out altogether $$J_l(\bar{x}_f) = |R_l(\bar{x}_f) + F_o(\bar{x}_f) + F_s(\bar{x}_f)|^2$$

$$= \frac{k_o^2 \cos^2(\bar{n}.\bar{x}_f)}{4\pi^2 |\bar{x}_f|^2} |\hat{R}_l(\bar{k}^E) + \hat{F}_o(\bar{k}^E) + \frac{k_o j}{2\cos(\bar{n}.\bar{x}_f)} \hat{F}_s(\bar{k}^E)|^2$$

$$\equiv C_j(|\bar{x}_f|) J_l(\bar{k}^E). \quad (31)$$

Variations of the reference field may be chosen such that:

$$\hat{R}_l(\bar{k}^E) = (\delta_l R(\bar{k}^E)) \hat{R}(\bar{k}^E) \quad (32)$$

From this the following is obtained:

$$J_l(\bar{x}_f) = \frac{k_o^2 \cos^2(\bar{n}.\bar{x}_f)}{4\pi |\bar{x}_f|^2} |\hat{R}(\bar{k}^E)|^2 |\delta_l R(\bar{k}^E) + \frac{\hat{F}_o(\bar{k}^E)}{\hat{R}(\bar{k}^E)} + \frac{k_o j}{2\cos(\bar{n}.\bar{x}_f)} \frac{\hat{F}_s(\bar{k}^E)}{\hat{R}(\bar{k}^E)}|^2 \quad (33)$$

from which it occurs that by employing three suitable variational elements $\beta_l R(\bar{k}^E)$, $l = 1,2,3$ it is possible to determine magnitude and phase of the ratios $\hat{F}_o(\bar{k}^E)/\hat{R}(\bar{k}^E)$ and $\hat{F}_s(\bar{k}^E)/\hat{R}(\bar{k}^E)$; former can be found from $J_l(\bar{x}_f)$, $l = 1,2,3$ without the object under measurement being present, the latter is obtained from a second set $J_l(\bar{x}_f)$, $l = 1,2,3$ when the object is present. It will be realized that this determination is in accord with the three reference procedures outlined above.

As shown in FIGS. 16 and 17 the output obtained from the photodetector PD ($C_j J_l(\bar{k}^E)$) is processed in a suitable data processor (computer) 10 in relation to the reference field $(\hat{R}_l(\bar{k}^E))$ to obtain the output data $(\hat{F}_s(\bar{k}^E))$ in regards to the field from the scattering source. FIG. 18 is a flow diagram indicating how the data may be handled.

FIG. 19 illustrates a method of determining from three-reference interferometric data, the distribution of the field transmitted by some gaseous object 11, i.e. a gas or a plasma. As for the microscopic scatterer, a beam of coherent light is passed through the gas sample $$F_s(\bar{x}_f) = \frac{k_o^2}{4\pi} \frac{1}{|\bar{x}_f|} \exp[jk_o|\bar{x}_f|] \int_v [n^2(\bar{x}')-1] F_o(\bar{x}')[\exp-j\bar{k}^E\bar{x}'] dv' \equiv C_s(|\bar{x}_f|) \hat{F}_s(\bar{k}^E) \quad (28)$$

$$F_o(\bar{x}_f) = \frac{k_o}{2\pi j} \frac{\cos(\bar{n}.\bar{x}_f)}{|\bar{x}_f|} \exp[jk_o|\bar{x}_f|] \int_s F_o(\bar{x}') \exp[-j\bar{k}^E\bar{x}'] ds' \equiv C_o(|\bar{x}_f|) \hat{F}_o(\bar{k}^E) \quad (29)$$

$$R_l(\bar{x}_f) = \frac{k_o}{2\pi j} \frac{\cos(\bar{n}.\bar{x}_f)}{|\bar{x}_f|} \exp[jk_o|\bar{x}_f|] \int_r R_l(x') \exp[-j\bar{k}^E\bar{x}'] dr' \equiv C_r(|\bar{x}_f|) \hat{R}_l(\bar{k}^E) \quad (30)$$

and a reference beam is produced optically by means of beam splitter plate P1, mirrors M5 and M6, attenuator AT, phase shifter PH, and beam splitter P2. Dotted circle C indicates a reference container inserted in the reference beam to compensate for the effect the container of the gas sample 11 has on the transmitted wave. The spectral density of the transmitted wave is displayed in the back focal plane 2 of the telescopic lens L1 of the telescope formed by lenses L1, L2 with focal lengths $f_1$ and $f_2$. In this plane the reference field focuses $R_l$, $l = 1,2,3$ are also generated. The telescopic lens L2 yields the Fourier transforms of the field distribution over plane 2. At the recording surface (plane 3), the magnitude and phase of the far field which arises from the distribution of the secondary sources over plane 2 are obtained. This system makes it possible to study gaseous objects of plasmas which may refract transmitted wave more strongly or which may both refract and attenuate the wave.

If the primary or secondary sources of two fields are distributed such that their distribution functions over some reference surface are approximately the same, the fields arising from these two source distributions will also be nearly the same at any given recording point.

If two such fields F and R are interferentially mixed, a "self-beating" of R with itself takes place to the extent that the distribution of F (over some reference surface) is the same as the distribution of R (over the same reference surface). This self-beating can be compensated for by placing a real filter of transmittance $1/|R|^2$ before the recording device — provided $1|R|^2 \neq 0$ in order to record instead of $J_l$, the filtered irradiante $I_l$:

$$I_l = \frac{J_l}{|R|^2} = |\delta_l R + \alpha|^2$$

With the here proposed method, the spatial distribution of the complex amplitude of some unknown optical field is determined by comparing pointwise the unknown field to a reference field. This comparison is done for both the magnitude and the phase of the two fields. In particular, the distribution of the phase can hardly be determined by any other method. According to the proposed holometric method phase and magnitude are determined as two independent constants; no assumptions are made relating one to the other. The phase distribution is obtained over a suitable reference surface such that it can be interpreted by way of comparison to the phase distribution of the reference wave.

Hence, this method is likely to be applied whenever there is interest to determine the phase distribution function $\Psi(x,y,z)$ of some spatial field, or when the fact that the phase distribution $\Psi(x,y,z)$ can be determined in addition to the magnitude distribution $A(x,y,z)$ likely facilitates the identification of some unknown object which scatteres or diffracts the light. The first of these categories contains the tasks of testing optical element as, e.g. lenses, mirrors, gratings, holograms, spatial filters, complex filters, computer-generated transmitting masks, integrated optical systems. The second category includes the experimental physics concerning the interaction between coherent light and matter. Another point of interest is that the spatial distribution in three dimensions of the scattering sources is detected quantitatively by holometry; the reconstruction of the source distribution can be accomplished.

Detecting the phase function $\Psi(x,y,z)$ increases substantially the amount of data by which one is able to specify an optical wave field. On the other hand, one will at first have to adapt optical designs to the specifications required by such a method; these specifications are, however, largely the same as have to be met by current coherent-optical designs.

Holometry may be visualized to be used towards the following subjects:

Optical testing: elements, instruments, waveguides, couplers, integrated systems, holograms, spatial filters, complex filters, antireflection coatings.

Optical scattering: microscopy (3-D objects, large working distances, living objects, improved resolution power), reflecting surfaces, diffusely remitting surfaces, gaseous objects, plasmas.

Optical pattern & character recognition: identification of biological cells, of bacteria, of air-borne particles, particle size analysis, character reading.

Referring to FIG. 20, a system incorporating phase shifting by polarization is illustrated. The variations $\delta_l \phi$ required for three reference interferometry can be obtained in a convenient and accurate way if a combination of double refraction and optical activity is used. Light from laser L passes through polarizing plate 11 to provide a polarized light beam whose direction of vibration is at an algne of 45° (to the plant of the paper and perpendicular to the optical axis) and through plane-parallel plates PPL1 and PPL2 to the doubly refracting prism DRP. The plane-parallel plates are arranged to be moved into and out of the optical path as required to provide necessary results. The prism DRP is made of birefringent material such as e.g. quartz or calcite with its optic axis oriented as e.g. shown in FIG. 20 for a Woolaston prism. The plates PPL1 and PPL2 are made of the same birefringent material as the prism DRP or some other suitable birefringent material. The birefringent prism DRP provides double refraction of the beam and also serves to split the beam into an illuminating wave IW and a reference wave RW. These pass via prism 12 to scatterer S and through an element OA providing optical activity such that the direction of vibration of the polarized light is charged. The phase differences $\delta_l \phi$ are given by:

$$\delta_l \phi = \frac{2\pi}{\lambda_o}(n_o - n_e) d_l + \text{const.} \quad l = 1,2,3 \qquad (35)$$

where $n_o$ and $n_e$ are the refractive indices of the ordinary ray ($o$) and extraordinary ray ($e$) and $d_l$ the thickness of the optical path common to the ordinary and extraordinary ray within the birefringent material. The difference $n_o-n_e$ is often rather small ($10^{-2}$ to $10^{-3}$) and hence rather large values of $d_l$ are required to make $\delta_l \phi$ some larger fraction of $2\pi$ e.g. $\pi/3$. This is similar to the conventional method of providing small optical phase shifts by birefringent compensators.

Instead of inserting additional slices (PPL1 and PPL2 giving $\delta_2 d$, $\delta_3 d$) of birefringent material as indicated in FIG. 20, the difference $n_o-n_e$ could be changed by using some material whose double refraction is a function of some physical quantity as e.g. external pressures or mechanical tension (stress birefringence, form birefringence, deformation birefringence), electrical field (Kerr-effect), magnetic field (Cotton-Mouton-effect), or a combinaton of the above.

The optical activity provided by the element (OA) has to turn back the direction of vibration by 90° so as to render coherent the two waves obtained as ordinary and extraordinary ray by the birefringent prism. This element would remain permanently in a setup of this type. It may consist of e.g., a solution of a substance exhibiting natural optical activity as e.g., sugar, some substance showing optical activity when an external magnetic field is applied (Faraday effect), e.g. water or glass, or some system combining the above.

The two waves are recombined by mirrors M7 and M8 and prism 13 to pass through polarizing plate 14 onto the surface of a scanning detector (photo-detector) PD. The output is taken as for the systems of figures 16 and 17 to data processor 10.

The method described above is effective in determining the spatial distribution of a wave field in terms of a reference wavefront. It has been found however that by using some pre-knowledge of the wavefront concerned and measuring deviations from an "a priori" wavefront shape, that information on the reference wavefront may be introduced and then be eliminated from the information on the unknown wave field. This technique to be described in more detail below involves a second measurement similar to the first but with a displacement or tilt by a small amount of the wavefront to be determined.

Both the method shown in U.S. Pat. No. 3,694,088 and the method described above are based on a conventional interferometer. This type of instrument is a bridge system. It compares the spatial distribution of the complex amplitude transmission of optical elements inserted into the branches of the interferometer. For example, if the complex amplitude transmission $T_1(x,y)$ of a lens is given as a fraction of the lateral coordinates $x$ and $y$, the complex amplitude $R(x,y)$ of the output wave of the first (or reference) branch of the interferometer is given by $$R(x,y) = T_1(x,y) I_1(x,y) \qquad (36)$$

where $I_2(x,y)$ is the complex amplitude of the wave incident at the reference branch. For the second (or object) branch one can write similarly $$F(x,y) = T_2(x,y) I_2(x,y) \qquad (37)$$

where $T_2(x,y)$ is the complex amplitude transmittance (or reflectance) of the object to be measured and $I_2(x,y)$ is the complex amplitude of the wave incident at the object branch. If the bridge is balanced then $$I_1(x,y) = I_2(x,y) = I(x,y) \qquad (38)$$

After the two output waves R and F are recombined the measured quantity $M(x,y)$ is given by $$M = |R+F|^2 = |R|^2 \left|1+ \frac{F}{R}\right|^2 = |R|^2 \left|1+ \frac{T_2 I_2}{T_2 I_2}\right|^2 \qquad (39)$$

(if bridge balanced $$\Rightarrow |R|^2 \left|1+ \frac{T_2}{T_2}\right|^2 ).$$

Note that in the case of a balanced interferometer the spatial distributions of the incident waves $I_2 = I_2 = I$ cancel. Since it may be assumed that the distribution of the square magnitude of the reference field $|R(x,y)|^2$ is known, Equation (39) shows that the measurable quantity M yields information either about the ratio of the two output waves F and R, that is about the quantity $$\alpha = \frac{F}{R} = \frac{Ae^{j\psi}}{Be^{j\phi}} \qquad (40)$$

or, if the bridge is balanced, about the ratio of the two amplitude transmittance (or reflectance) functions, that is about the quantity $$\beta = \frac{T_2}{T_1} \qquad (41)$$

Both the present method and that of U.S. Pat. No. 3,694,088 achieve the determination of the ratio $\alpha$ (or $\beta$) from a series of three or more values of M.

U.S. Pat. No. 3,694,088 defines the reference wave front R as the wave front $$R \equiv T_1 \cdot 1. \qquad (42)$$

That is, the reference wavefront is taken to be the same as the modulation of a wave of unit (complex) amplitude distribution by the reference object of a transmittance function $T_1$. This procedure is valid provided, (a) the measurement is aimed at nothing but one of the ratios $\alpha$ or $\beta$, see Equations (5) and (6), whereby with a balanced bridge the distribution $I(x,y)$ cancels and can therefore be taken as unit amplitude, (b) the transmittance (or reflectance) function $T_1(x,y)$ is defined with sufficient accuracy by the material reference object. These conditions apply for example, when two optical elements as, e.g. mirrors or lenses are to be compared, and the optical element in one of the branches can serve as reference (or standard). Plane reference surfaces can in fact be manufactured (surface mirrors or optical flats) to within fractions of the wave length of light over its entire cross sectiion. However, for any surface other than a plane surface, in particular for a spherical surface, a definition of the reference wave front by a reflectance or transmittance function of a material reference object would become extremely difficult, if one requires interferometric accuracy, i.e. if one wanted to know the distribution $T_2(x,y)$ to whithin fractions of $2\pi$, rather than to remain content with some reference object that defines a standard reference spherical wave front. (If a combination of a spherical lens and an optical flat would be used to define a spherical reference wave R with interferometric accuracy, some preknowledge about the complex amplitude transmittance of the lens (in terms of both accuracy and fidelity) would be required which is not available from conventional techniques of manufacturing and optical testing).

In short, if it is intended to compare two optical reflectance (or transmittance) functions, the distribution between R and $T_2$ can be dropped within the context of a well-balanced interferometer. Then R can be defined by $T_1$, that is by some standard reference object. This procedure leads to a definition of R to within fractions of wavelength of light, if the reference object is an optically flat surface. But it fails to do so (with comparable accuracy and fidelity), if the reference wave front required is a spherical one.

The present method aims at determining (in absolute terms) the spatial distribution $F(x,y,z)$ of an amplitude and phase-modulated spherical object field, see FIG. 21. One therefore needs to know the reference distribution function $R(x,y,z)$. In particular, one needs to know $R(x,y,z)$, if this is a spherical or an approximately spherical wave. Hence, a method and apparatus is described to determine experimentally R without relying on the transmittance (or reflectance) function $T_1$ of some material object. This procedure, in short, consists of a determining experimentally the spatial distribution R except some irrelevant complex-valued constant whereby some a priori knowledge concerning the essentially spherical symmetry of this distribution is utilized.

Both U.S. Pat. No. 3,694,088 and the present system vary the reference field so as to obtain a decoding of relation Equation (4), that is to find the complex numbers $\alpha$ or $\beta$ from M. For this the variations required are introduced in a way such that R at one and the same recording point $k$ ($R_k$) is affected in a known way, but no knowledge is required as to how these variations that affects $R_k$ do affect R at some other recording point $p_l(R_p)$. On the contrary, the most convenient form of variations of R within the contex of the methods of U.S. Pat. No. 3,694,088 and that described above are variations that affect R at one and the same point (say $k$) only. For example, the three reference fields $R_1(k)$, $R_2(k)$, $R_3(k)$ proposed by these methods refer to one and the same recording point, for example to the point $k$ given by recording coordinates $x_k$, $y_k$, $z_k$. No knowledge (information) has been introduced or utilized yet concerning the way how the complex amplitude of R at some recording point $k(R_k)$ relates to the complex amplitude on some other recording point $p(R_p)$. If one denotes by an arrow the process of variations, in the earlier methods the variations are carried out in such a way that R is changed by $$R_1(k) \rightarrow R_2(k) \rightarrow R_3(k) \qquad (43)$$

whereby the information required to carry out the variation " $\rightarrow$ " concerns only the changes at one and the same recording point $k$, ($k = 1,2 \ldots N$) (N: number of recording points.) Contrarily, the changes to be described now are such that information is introduced and utilized relating some value of R at one recording point $k$ to some value of R at another recording point $p$, that is a transformation is considered of the form $$R(k) \rightarrow R(p)$$
where $k \neq p$.

The procedure indicated by Equation (44) is explained in more detail below. It permits one to find the distribution $R_{(k)}$, $k = 1,2 \ldots N$ from two sets of measured values $M_{(k)}$, $k = 1,2 \ldots N$ and from the information concerning the changes indicated by the arrow in Equation (44); these changes relate, in a known way, the values of R at different recording points. No restrictions have to be made for the spatial distribution of R, in particular a spherical wave is permitted.

The spatial distribution of the reference wavefield of an amplitude and phase-modulated spherical wave (see FIG. 21) is determined as follows. It occurs from Equation (39) and (40) that for any given recording point $k$ the value $\alpha = F/R$ is determined from experiment. In order from $\alpha$ to find both the magnitude and phase of the object field $F = Ae^{j\psi}$ one needs to know $\beta$: the magnitude (or irradiance) of the reference field, and $\phi$: the spatial part of the phase of this field at the recording point $k$. The measurement of $\beta$ can readily be achieved using a conventional photometric method, and therefore the essential problem is the determination of $\phi$ at the point $k$. With reference to FIG. 22, as long as the value of $\phi$ is not known, the measured value of $\alpha$ allows one merely to determine the difference $\Psi - \phi$ of the phase functions of object and reference field at the point $k$. It is required, however, to determine the distribution of $\Psi$ for all recording points $k = 1,2 \ldots N$ in absolute terms, For this it is necessary to find the distribution $\phi$ of the reference wave for $k = 1,2, \ldots N$. Since the addition of a constant (independent $k$) to the phase function $\phi$ does not matter, this is equivalent to the task of finding all the phase differences $$d_{kp} = \phi_k - \phi_p \qquad (45)$$

for all values $k = 1,2 \ldots N$ and $p = 1,2 \ldots N$. But the difference of the phase between the $k^{th}$ and the $p^{th}$ point is independent of the "way" along which one connects these points, and hence the quantities $d_{kp}$ are related by relations of the form:

$$d_{kp} = d_{k \cdot \alpha_1} d_{\alpha_2} d_{\alpha_2} \cdots d_{\alpha_{u,p}} = \Sigma d_{\alpha_r \cdot \alpha_s} \qquad (46)$$

where the labels $\alpha_r$ and $\alpha_s$ are to be taken along any possible path (chain) connecting the points $k$ and $p$.

A first determination of the distribution $k$ of $$\frac{1}{\alpha} = \frac{R}{F}$$

is obtained following the method given above with some arbitrary object field F. Then the reference field is changed in a known way such that the new distribution $R^1(k)$ is related to the initial distribution by way of a linear transformation $$R^1(k) = \sum_{i=1}^{N} t_{ki} R(i) \qquad (48)$$

where the $t_{ki}$ form a known (complex-valued) matrix. ($k = 1,2 \ldots N$. $i = 1,2, \ldots, N$. N: Number of recording points.) With the same object field as before and with $R^1$ instead of R a second set of the quantity $((1/\alpha))$ for all recording points $k = 1,2, \ldots, N$ is determined following the method given above. The ratio $\mu$ of the two quantities so obtained $$\mu_k = \begin{cases} \dfrac{(1/\alpha)^1_k}{(1/\alpha)_k} = \dfrac{R^{1(k)}}{R^{(k)}} = \dfrac{\Sigma_i t_{ki} R(i)}{R_{(k)}} = \Sigma_i \dfrac{B^{(i)}}{B^{(k)}} e^{j d_{ik} \cdot k_i} \\ \\ = \Sigma t_{ki} D_{ki} \end{cases} \qquad (49)$$

relates the measureable quantities $\mu_2, \mu_2 \ldots$ to the unknowns $D_{ki}$ ($k = 1,2,\ldots,N$, $i = 1,2,\ldots N$). If the matrix $\underline{\underline{t}}$ of the coefficients of the linear transformation $$\underline{R}^1 = \underline{\underline{t}} \cdot \underline{R} \qquad (50)$$

is nonsingular, the relation given in Equation (49) together with some (or all) of the relations given in Equation (11) always allow one to uniquely determine the desired quantities $$D_{ki} = \frac{B_i}{B_k} e^{jd_{ik}}$$

or (since one can measure separately $B_i$ and $B_k$) the phase difference $d_{ki}$ for all N recording points. The Equation (46) may also be expressed in the form $$D_{ki} = \begin{cases} D_{k,\alpha_1} \cdot D\alpha_1._{\alpha_2} \ldots D\alpha_{v,i} = \\ \pi D \alpha_{r,\alpha_s} \end{cases}$$

where $\alpha_r, \alpha_s$ are taken along any possible path (chain) connecting the points $k$ and $i$.

The following are examples of the mathematical techniques for making the necessary measurements:

EXAMPLE No. 1

The linear transformation is a spatial shifting of the data vector ($R(k)$) by one unit in the $k$-domain:

$$R^1(k) = R(k-1) \qquad (52)$$

that is $t_{ki} = \delta_{k,i-1}$
where $$\delta_{mn} = \begin{cases} 0 \text{ for } m \neq n \\ 1 \text{ for } m = n \end{cases}$$

Then one has for the measurable quantities $\mu_k$:

$$\begin{aligned} \mu_1 &= D_{12} \\ \mu_2 &= D_{23} \\ &\vdots \\ \mu_{k-1} &= D_{k-1,k}. \end{aligned}$$

Using Equation (51) one finds the complex amplitude of the reference wave at the $k^{th}$ recording point ($R_k = B_k e^{j\phi_k}$) except an irrelevant complex factor $B_1 e^{j\phi_1}$ from $$\mu_1 \cdot \mu_2 \ldots \mu_{k-1} = D_{12} D_{23} \ldots D_{k-1,k} = D_{1k} =$$

$$= \frac{B_k e^{j\phi_k}}{B_1 e^{j\phi_1}}$$

for $k = 2,3\ldots,N$.

EXAMPLE No. 2

The linear transformation of the data vector $R(k)$ consists of two simultaneous spatial shiftings, one by one unit, the other by two units, in the $k$-domain:

$$t_{ki} = \delta_{k,i-1} \delta_{k,i-2}$$

with $\delta_{mn}$ as in Equation (52).
Then the following equations can be solved for $D_{ki}$:

$$\mu_2 = D_{12} D_{13}, \mu_3 = D_{23} D_{24},\ldots,\mu_{k-2} = D_{k-2,k-1} D_{k-2,k} \qquad (54)$$

$$D_{13} = D_{12}D_{13}, D_{14} = D_{12}D_{24},$$

$$D_{14} = D_{12}D_{23}D_{34}, D_{24} = D_{23}D_{34}, \qquad (55)$$

The first two equations of Equation (54) together with the first 4 equations of Equation (55) allow one to determine the unknowns $D_{12}, D_{23}, D_{34}$ (and also the redundant unknowns $D_{13}, D_{14}$, and $D_{24}$). From these numbers the desired quantities $R_2, R_3, R_4$ are found as in example no. 1, except the irrelevant complex-valued constant $R_1$.

EXAMPLE No. 3

The linear transformation ($\underline{\underline{t}}$) of the data vector $R_k$, see equations (50) consists of the convolution of $R_k$ with some other known function of $k$ ($H_k$):

$$R_{(k)}^1 = \sum_{i=1}^{N} t_{ki}R_{(i)} = \sum_{i=1}^{N} H_{(k-i)}R_{(i)}$$

In this case one obtans a solution in particular if the function $H_{(k)}$ is non-zero only within a small range of values $k$. (Note also that the Examples No. 1 and the No. 2 above are special cases of Example No. 3, such that $H_k$ is either equal to $$H_k = \delta_{k,1} \qquad \text{(Ex. No. 1)}$$

and $$H_k = \delta_{k,-1} \delta_{k,-2} \qquad \text{(Ex. No. 2)}$$

respectively. Here the meaning of $\delta_{mn}$ is the same as in Equation (52).

Referring again to the apparatus shown in FIGS. 16 and 17, the means for carrying out the physical operations indicated by the above examples is some form of optical element D placed in the optical path as shown. Device D is such as to tilt the beam in a prescribed manner. Examples of these are as follows:

Tilting the reference wavefront by inserting, into the reference beam, some deflecting elements.

The prism shown in FIG. 23 is oriented so that its axis $\overline{AB}$ is parallel to the $y$-axis of the coordinate system. If the refractive index of the prism $n_p$ is unequal from the refractive index $n_o$ of the surrounding medium (e.g. air), a collimated beam incident on $z$-axis will be deflected by this prism in the $xz$-plane by an angle $$\delta = \gamma (n-1)$$

where $n = n_p/n_o$.
The vector $\overline{k}_o$ shows the direction of the incident reference beam without the prism present, the vector $\overline{k}_i$ indicates the direction of this beam (in the $xz$-plane)

tilted by δ due to insertion of the prism (or some other beam deflecting element).

Similarly be deliberately increasing the reflectivity of the surfaces of the prism (by silvering them) as shown in FIG. 24 it is possible to obtain from the initial reference bean on z-axis obtain two beams deflected in the xz-plane by angles $\delta_1, \delta_2$ respectively.

By inserting, into the reference bean (either before or after the first one), a second prism whose prism axis is parallel to the x-axis of the coordinate system the the reference beam is deflected in the yz-plane by some angle $\epsilon$ (or, if the prism is silvered, by two angles $\epsilon_1, \epsilon_2$). This beam also passes through a focussing lens LS (see FIG. 17) or a focussing mirror MI (see FIG. 16) in order to generate in the plane z=0 of the coordinate system, the reference focus R, that is a distribution of magnitude and phase over the plane z=0, the magnitude of which is essentially confined to within small limits in the xy-plane, namely $\pm\Delta L_x, \pm\Delta L_y$. The interference pattern $I_l$, $l = 1,2,3$, is under recorded under far-field conditions with respect to both object and reference focus. That is, certainly the conditions are such that $$|\bar{x}_f| >> \frac{(\Delta L_x)^2}{\lambda_o} \text{ and } |\bar{x}_f| >> \frac{(\Delta L_y)^2}{\lambda_o}.$$

The distribution of the complex amplitude of the reference field over the plane z=0 (perpendicular to the optical axis, containing the point Q, FIG. 16 or Q', FIG. 17, respectively is given by R(x,y;o). R(x,y;o) contains all the (partly unknown) effects of the lens LS (or mirror MI) on the initially collimated reference beam; this includes abberration, distortion, coma, and diffraction at the aperture, by lens LS (mirror MI). If a deflecting element is inserted that deflects the reference beam by a small angle δ in the xz-plane, the distribution R(x,y;0) is changed within good approximation according to the relation $$R(x,y,;0) \rightarrow R^1(x,y;0) = R(x,y;0)e^{j[k_0(x\sin\delta + y\sin\epsilon) + \eta]}$$

where $k_o$ is the wave number and ζ is some phase constant.

Similarly, if one deflecting element deflects the reference beam by some small angle δ in the xz-plane and by a second small angle $\epsilon$ in the yz-plane, the resulting change can approximately be written as $$R(x,y;0) \rightarrow R^1(x,y;0) = R(x,y;0)e^{j[k_0 x\sin\delta + y\sin\epsilon + \eta]}$$

where n is another phase constant. In other words, the initial distribution R is multiplied by the phase over the plane z=0 of a plane off-axis wave with propagation vector $\bar{k}^i$, where $$\bar{k}^i = \begin{pmatrix} k_x^i \\ k_y^i \\ k_z^i \end{pmatrix} = k_o \begin{pmatrix} \cos\alpha \\ \cos\beta \\ \cos\zeta \end{pmatrix} = k_o \begin{pmatrix} \sin\delta \\ \sin\epsilon \\ \sqrt{1 - \sin^2\delta - \sin^2\epsilon} \end{pmatrix}. \quad (56)$$

The far field of the distribution R(x,y;0) is given by Equation 30.

$$R(x_f) = \frac{k_o}{2\pi j} \frac{\cos(\eta, x_f 0)}{|x_f|} e^{jk_0|x_f|} R(k^E)$$

where $$R(\bar{k}^k) = \int_s R(x,y;0)e^{-j\bar{k}\cdot\bar{r}} dxdy = \int_s R(x,y,;0)e^{-j(k_x x + k_y y)} dxdy$$

$$\bar{k}^k = k_o \frac{\bar{x}_f}{|\bar{x}_f|}$$

Combining equations it will be seen that a tilting the beam by angles δ and $\epsilon$ causes the far-field distribution to change by $$R(\bar{k}^E) \rightarrow R^1(\bar{k}^E)$$

$$= \int R(x,y,;0)e^{j[k_o(x\sin\delta + y\sin\epsilon) - (k_x^d x + k_y^d y) + \eta]} dxdy$$

$$= \int R(x,y,o)e^{-j[(k_x - k_x^i)x + (k_y - k_y^i)y + \eta]} dxdy$$

$$\approx R(\bar{k}^E - \bar{k}^i)$$

The meaning of this equation is that by tilting the reference beam the reference far-field wavefront is simply translated in the recording domain in a way such that a value of the complex amplitude of R that was initially found at $\bar{k}^E$ $\bar{k}^E = k_o \bar{x}_f / |\bar{x}_f|$ is after tilting found at $\bar{k}^E - \bar{k}^i$, that is $$\bar{k}^E = k_o \frac{\bar{x}_f}{|\bar{x}_f|} \rightarrow \bar{k}^E - \bar{k}^i.$$

of if we set $|\bar{x}_f| = r$, $$x_f \rightarrow x^1_f = x_f - r \sin\delta$$

$$y_f \rightarrow y^1_f = y_f - r \sin\epsilon.$$

Beam Deflection by Diffraction

FIG. 25 shows an example of an electrooptical beam-deflecting element based on optical diffraction in order to provide suitable tiltings of the far-field reference wavefront in both the xz-plane and the yz-plane.

An optically homogeneous and isotropic slab B shaped as a rectangular parallelepiped is brought in acoustical contact with two transducer TR1, TR2, in a way such that two standing acoustical waves are generated in mutually perpendicular directions; first standing acoustical wave is along the x-axis due to the transducer TR1 and the reflection of the wave at the bottom and surface E1, the second standing acoustical wave is along the y-axis due to the transducer TR2 and the reflection of the wave at the far end surface E2. The body B may be of a translucent solid material as e.g. glass, or of a translucent liquid as, e.g. xylol, or of a gas.

It is well known (Debye, Sears, 1932) that the variation of the optical refractive index caused by the standing acoustical wave in the slab B forms a phase grating such that an incident initially collimated beam is split into a number of collimated beams with propagation vectors $\bar{k}_1^{(\pm)}$, $\bar{k}_2^{(\pm)}$, etc. where the subscript $m$ in $k_m^{(\pm)}$ refers to the order of diffraction at the grating, and the superscripts ($\pm$) indicate that due to symmetry for any collimated wave with propagation vector $$\bar{k}^{(+)} = \begin{pmatrix} +k_x \\ +k_y \\ +k_z \end{pmatrix}$$

there is also the wave with the propagation vector $$\bar{k}^{(-)} = \begin{pmatrix} -k_x \\ -k_y \\ +k_z \end{pmatrix}.$$

The propagation vectors for which diffraction of orders $m$ and $n$, respectively, occurs at such a two-dimensional phase grating are given by the formulae (M. Born, E. Wolf, Principles of Optics, Third Edition, p. 594).

$$k_{x,m}^{(\pm)} = m \frac{\lambda_o}{\Lambda_x}$$

$$k_{y,n}^{(\pm)} = n \frac{\lambda_o}{\Lambda_y}$$

hereby $m, n = 1, 2 \ldots$ indicates the order of diffraction, $\lambda_o$ is the vacuum wavelength, and $\Lambda_x$, $\Lambda_y$, respectively denote the wavelength of the sound wave in the $x$- or $y$-direction $$\Lambda_x = \frac{V_B}{\nu_{T1}}$$

$$\Lambda_y = \frac{V_B}{\nu_{T2}}$$

where $V_B$ is the velocity of sound in the substance of the body B, and $\nu_{T1}$, $\nu_{T2}$ are the acoustical frequencies of the transducers $T_1$, $T_2$, respectively.

The $k_{x,m}$, $K_{y,n}$ are to be inserted into Equations (56) and (57) above, and one obtains for the translation of the wavefront in this case:

$$x_f \rightarrow x_f' = x_f \pm rm \frac{\nu_o}{\Lambda_x}$$

$$y_f \rightarrow y_f' = y_f \pm rn \frac{\lambda_o}{\Lambda_y}$$

By continuously varying $\Lambda_x$ and $\Lambda_y$, the wavefront can be translated continuously, $\Lambda_x$ and $\Lambda_y$ are generally known with high accuracy such that this method allows the translation of the far-field wavefront sensitively and accurately.

Gaseous Wedge

A wedged-shaped chamber inside a glass body (see FIG. 26a and 26b) is filled alternately with two gases of different refractive indices, $n_o^{(1)}$, $n_o^{(2)}$. The resulting difference $\delta$ of the angle of deflection of this element obtained with two different gas fillings is given by $$\delta = \frac{\eta_o^{(2)} - \eta_o^{(1)}}{\eta_o^{(2)} \cdot \eta_o^{(1)}} \gamma$$

Since gases are readily available that have the refractive index, small values of $\delta$ can be obtained at conveniently large values of $\gamma$. For example:

$$n_o^{(2)} - n_o^{(1)} = 1 \cdot 10^{-3}$$
$$n_o^{(2)} \cdot n_o^{(1)} \cong 1.0$$
$$\delta \cong 10^{-3} \cdot \gamma$$

The essential advantage of such a gaseous wedge is comparison to a wedge made of glass is that large values of the tolerance can be permitted for planeness of all outer and inner surfaces. As long as these deviations from planeness stay constant during the measurement they do affect the complex amplitude distribution $R(x,y,0)$ of the reference wave field over the plane $z=0$ but are eliminated from the result by the proposed method of tilting the far-field reference wavefront.

To use this method in practice, two stages of measurement are carried out. The first stage consists of using apparatus as exemplified by that shown in FIGS. 16, 17, and 19 and consists in engendering a reference wave field, then recording, under far field conditions by means of a photodetector, three interference fringe patterns, which belong to the unknown field and variations of the reference wave field, and recording data in numerical form obtained from the photodetector. The information obtained is sufficient to compute numerical values of magnitude and phase of the wave field being measured but assumes knowledge of the distribution of the reference field. The second stage consists of repeating the above procedure but this time with a small tilting or shifting of the reference wavefront about an axis ($x$ or $y$ axis). This tilting is achieved by element D shown in FIGS. 16 and 17 which is moved into the reference wave optical path to achieve this tilting. Element D is any optical element that will cause the necessary tilt or shift and is exemplified by the devices already described in FIGS. 23, 24 25 and 26a and 26b.

FIG. 27 illustrates a tilting of the reference wavefront about the $y$-axis. The unknown wavefront to be measured is exemplified as curve U and reference wavefront as $V_o$. Upon a tilt of an angle $\delta\Omega$ (from reference vector $P(\Omega,\phi,r)$ lying at an angle $\Omega$ from the $y$-$z$ plane), the reference wavefront becomes $$V_o \frac{\delta V_o}{\delta \Omega} \delta \Omega.$$

By making the two stages of measurements, sufficient information is obtained at each recording point to describe the distribution of the unknown wave in absolute terms. The reference wavefront is introduced but is in effect eliminated from the information in the second stage of measurement as discussed earlier and the resulting data provides information on the unknown wave front in terms of a pure spherical wave front.

I claim:

1. A method of numerically determining the distribution of magnitude and phase of a time harmonic electromagnetic, particularly an optical, wave field comprising:

a. engendering a reference wave field such that its spatial distribution is similar to the field to be measured whereby fringes are obtained the position of which varies slowly with the recording coordinates;

b. using the reference wave as reference surface;

c. recording under far field conditions point by point by means of photodetector three interference fringe patterns which belong to the unknown field and variations of the said reference field distribution, the relationship of said variations as to magnitude and phase being such as to uniquely determine, for any recording point, the amplitude and phase distribution of the unknown electromagnetic wave field;

d. recording data in numeral form obtained from the photodetector;

e. placing an optical element in the said reference wave optical path such that the reference wave front is shifted in relation to the unknown wave front by a small known amount;

f. repeating the measurements as in (c) and (d); and g. processing said data to obtain numeral values of magnitude and phase of the electromagnetic wave field being measured, such as to provide information in terms of a smooth spherical wavefront.

2. A method as in claim 1 wherein the optical elements is a prism.

3. A method as in claim 1 wherein the optical element is a prism having silvered surfaces providing two shifts of the reference wavefront beam.

4. A method as in claim 1 wherein the optical element is a gaseous wedge in the form of a wedge-shaped chamber inside a glass body which is filled alternately with two gases of different refractive indices to provide the necessary shifting.

5. A method as in claim 1 wherein the optical element is an electro-optical beam deflecting element formed of a rectangular parallelopiped block of optically homogeneous and isotropic material having two acoustical transducers mounted thereon such as to generate two standing acoustical waves in mutually perpendicular directions that act as a diffraction grating to cause deflection of the reference beam by diffraction.

6. A method of numerically determining the distribution of magnitude and phase of an unknown time harmonic electro-magnetic, particularly an optical wave field comprising:

a. engendering a reference electromagnetic wave field such that its spatial distribution is similar to the wave field to be measured, whereby on interference between the unknown and reference wave fields, fringes are obtained the position of which varies slowly with the recording coordinates;

b. using the wavefront of the reference wave as a reference of the field to be measured in particular the reference field being such that its spatial distribution is similar to the field to be measured, whereby the ratio of the complex-valued amplitude of object field and reference field depends weakly on the spatial coordinates and consequently the recording coordinates may be known only within limits large compared to the wavelength of the light;

c. recording point by point by means of a photodetector three or more interference fringe patterns which belong to the unknown field and variations of said reference field distributions, the relationship of said variations being such that for any recording point the complex-valued amplitude $R_l$ of the $l$th variation, $l = 1,2,3,\ldots$ satisfies the relation $$R_l = (\delta_l R)R$$

where $R$ is some arbitrary complex number and where real and imaginary parts of the complex numbers $\delta_l R = \delta_l R_r\, j\delta_l R_i$ are known and satisfy the condition $$(\delta_1 R_r - \delta_2 R_r)(\delta_2 R_i - \delta_3 R_i) - (\delta_2 R_r - \delta_3 R_r)(\delta_1 R_i - \delta_2 R_i) \neq 0$$

d. solving by means of a computer the simultaneous system of equations $$\frac{J_1}{|R|^2} - (\delta_1 R_r)^2 - (\delta_1 R_i)^2 = (\alpha_r)^2 + (\alpha_i)^2 + 2(\delta_1 R_r)\alpha_r + 2(\delta_1 R_i)\alpha_i$$

$$\frac{J_2}{|R|^2} - (\delta_2 R_r)^2 - (\delta_2 R_i)^2 = (\alpha_r)^2 + (\alpha_i)^2 + 2(\delta_2 R_r)\alpha_r + 2(\delta_2 R_i)\alpha_i$$

$$\frac{J_3}{|R|^2} - (\delta_3 R_r)^2 - (\delta_3 R_i)^2 = (\alpha_r)^2 + (\alpha_i)^2 + 2(\delta_3 R_r)\alpha_r + 2(\delta_3 R_i)\alpha_i$$

for $\alpha_r$ and $\alpha_i$ at every recording point with given data of $J_1, J_2, J_3, \ldots$ of the irradiance and with known values of $|R|^2$, $\delta_l R_r$, and $\delta_l R_i$, $l = 1,2,3,\ldots$, and where $\alpha_r$, $\alpha_i$ are real and imaginary part, respectively, of the ratio of the complex-valued amplitude of the field to be measured and the reference field at the recording point;

e. placing an optical element in the said reference wave optical path such that the reference wave front is shifted in relation to the unknown wave front by a small known amount;

f. repeating the steps of (c) and (d) such that the method is carried out twice with one object field of arbitrary spatial distribution but two variations of the reference field such that the complex-valued amplitude of the 1st reference field at the $(k\,1)$th recording point $(R_1(k\,1))$ and the complex-valued amplitude of the second reference field at the kth recording point $(R_2(k))$ satisfy the relation $$R_1(k+1) = f(k)\, R_2(k),$$

where $f(k)$ is a known complex number and whereby the complex-valued amplitude of the 1st reference field $R_1$ at the kth recording point can be derived (except some irrelevant constant $(R_1^1)$ from the expression $$\frac{R_1(k)}{R_1^1} = \mu(1)\,\mu(2)\ldots\mu(k-1)f(1)f(2)\ldots f(k-1)$$

where the complex number $\mu(k)$ is the ratio of the measurable quantities $\alpha_1(k)$ and $\alpha_2(k)$ obtained at the $k$th recording point with the said two variations of the reference field, $$\mu(k) = \frac{\alpha_1(k)}{\alpha_2(k)} = \frac{R_2(k)}{R_1(k)} = \frac{1}{f(k)}\,\frac{R_1(k+1)}{R_1(k)}\,;$$

and g. processing said data to obtain numeral values of magnitude and phase of the electromagnetic wave field being measured, said data being sufficient to eliminate the reference wave information from the obtained information which can be related to a mathematically exact wavefront.

7. A method as in claim 6 wherein the optical element is a prism.

8. A method as in claim 6 wherein the optical element is a gaseous wedge in the form of a wedge-shaped chamber inside a glass body which is filled alternately with two gases of different refraction indices to provide the necessary shifting.

9. A method as in claim 6 wherein the optical element is an electro-optical beam deflecting element formed of a rectangular parallelopiped block of optically homogeneous and isotropic material having two acoustical transducers mounted thereon such as to generate two standing acoustical waves in mutually perpendicular directions that act as a diffraction grating to cause deflection of the reference beam by diffraction.

* * * * *